United States Patent
Zeng et al.

(10) Patent No.: US 8,718,019 B2
(45) Date of Patent: May 6, 2014

(54) METHOD, SYSTEM AND APPARATUS FOR MANAGING CALL HANDOFF

(75) Inventors: Ximing Zeng, Waterloo (CA); Jerod David Klink, Kitchener, CA (US); Christopher Edward Prest, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 266 days.

(21) Appl. No.: 13/090,361

(22) Filed: Apr. 20, 2011

(65) Prior Publication Data

US 2012/0269171 A1   Oct. 25, 2012

(51) Int. Cl.
*H04W 4/00* (2009.01)

(52) U.S. Cl.
USPC .......................................................... 370/332

(58) Field of Classification Search
USPC ............................ 370/331–334; 455/436–444
See application file for complete search history.

(56) References Cited

U.S. PATENT DOCUMENTS

| | | | |
|---|---|---|---|
| 2005/0271011 A1* | 12/2005 | Alemany et al. | 370/331 |
| 2006/0025141 A1* | 2/2006 | Marsh et al. | 455/445 |
| 2007/0183402 A1 | 8/2007 | Bennett et al. | |
| 2008/0076428 A1* | 3/2008 | Jagadeesan et al. | 455/436 |
| 2009/0022103 A1* | 1/2009 | Shatsky | 370/331 |
| 2009/0092093 A1* | 4/2009 | Wu et al. | 370/331 |
| 2010/0142477 A1 | 6/2010 | Yokota | |
| 2010/0246430 A1* | 9/2010 | Egan et al. | 370/252 |
| 2011/0013591 A1 | 1/2011 | Kakumaru | |

FOREIGN PATENT DOCUMENTS

EP    2009851 A1   12/2008

OTHER PUBLICATIONS

Vo WiFi Toyo http://www.octoscope.com/English/Collaterals/Presentations/octoScope_VoWiFi_Toyo_20050516.pdf Retrieved from the internet on May 10, 2005.
VoWiFi WiFiVoice http://www.octoscope.com/English/Collaterals/Presentations/octoScope_VoWiFi_WiFiVoice_200505.pdf Retrieved from the internet on May 10, 2005.
European Patent Application No. EP 11 16 3237.8 Search Report dated Sep. 29, 2011.

\* cited by examiner

*Primary Examiner* — Chi Pham
*Assistant Examiner* — Fahmida Chowdhury
(74) *Attorney, Agent, or Firm* — Perry + Currier Inc.

(57) ABSTRACT

A method, system and apparatus for managing call handoff are provided. A mobile device engaged in a first media session over a first transport determines a second transport is available. A reflected media session is established via an echo server over the second transport. Quality of the reflected media session is evaluated by determining a call metric based on call transport data received at the mobile device from the mobile device (itself) in the reflected media session. Call handover is requested from the first media session to a second media session over the second transport when the call metric indicates that the quality of the reflected media session meets a threshold.

10 Claims, 23 Drawing Sheets

METHOD, SYSTEM AND APPARATUS FOR MANAGING CALL HANDOFF

FIELD

The specification relates generally to telecommunications, and specifically to a method, system and apparatus for managing call handoff.

BACKGROUND

The computational capabilities of mobile electronic devices (such as cellular phones, smart phones and the like), as well as the capabilities of their associated networks, continue to grow. At the same time, ever greater demands for increased functionality are imposed on such devices and networks. Thus, despite the growing capabilities of mobile devices and wireless networks, they remain less able to meet those demands than their mains-powered and wired counterparts.

BRIEF DESCRIPTIONS OF THE DRAWINGS

Embodiments are described with reference to the following figures, in which.

DETAILED DESCRIPTION OF THE EMBODIMENTS

Figure 1:
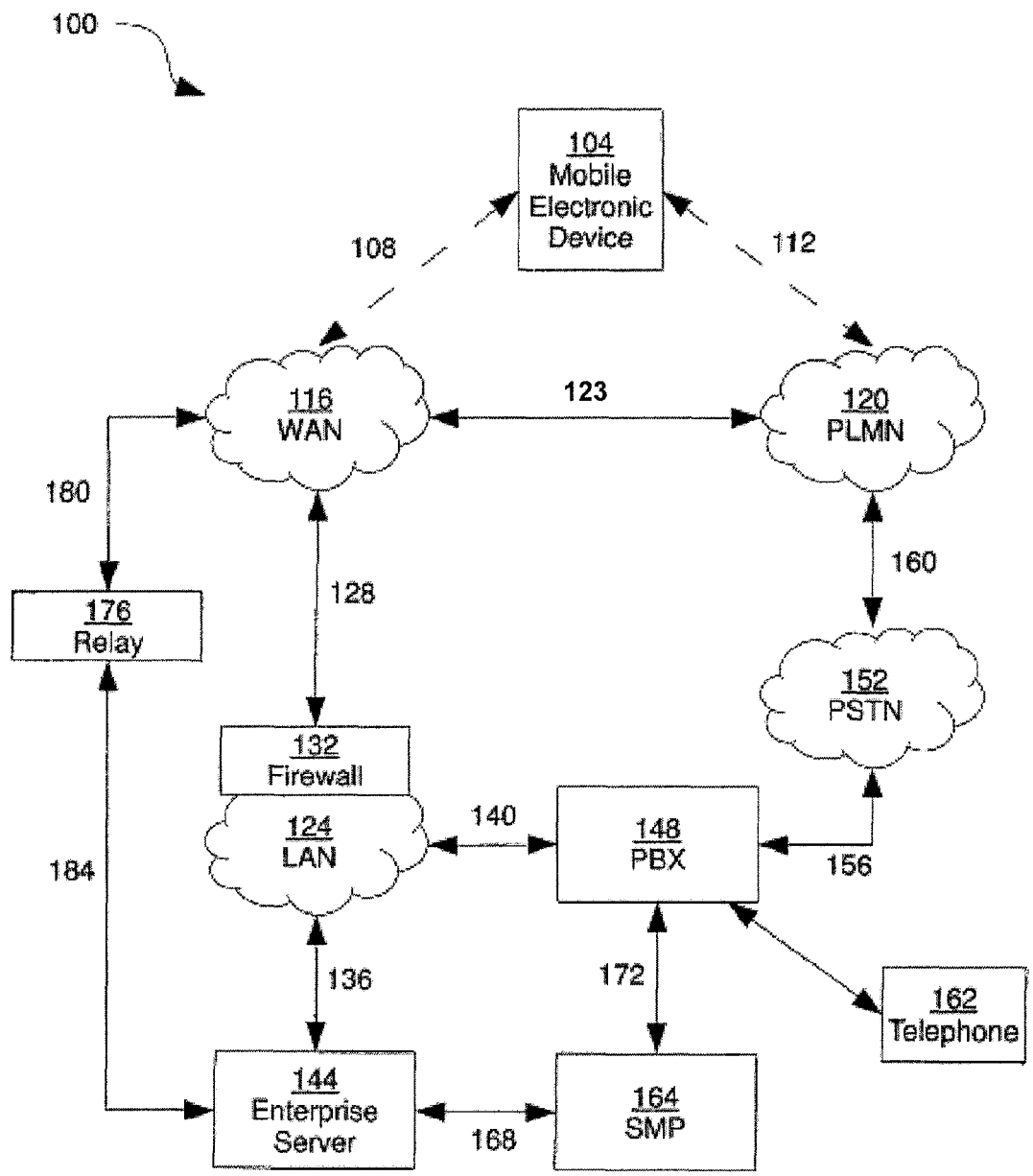
FIG. 1 depicts a system for managing enterprise-related communications, according to a non-limiting embodiment.

According to an aspect of the specification, a method of managing call handoff is provided, comprising: receiving a request from a mobile electronic device to initiate handover of a first media session between the mobile electronic device and a private branch exchange (PBX) from a first transport to a second transport; establishing a second media session with the mobile electronic device over the second transport; shuffling call media from the first media session to the second media session; and responsive to shuffling the call media, terminating the first media session.

According to another aspect of the specification, a method of initiating call handoff is provided, comprising: monitoring available transports; receiving input data indicative of a command to provide call handoff options; controlling a display device to generate a representation of at least one call handoff option based on the results of the monitoring; receiving input data indicative of a command to move an ongoing call from a first transport to a second transport; and transmitting a call handoff request.

According to a further aspect of the specification, a server for managing call handoff is provided, comprising: a communications interface for receiving a request from a mobile electronic device to initiate handover of a first media session between the mobile electronic device and a private branch exchange (PBX) from a first transport to a second transport; a memory; and a processor interconnected with the communications interface and the memory, the processor configured to receive the request from the communications interface, to establish a second media session with the mobile electronic device over the second transport; to shuffle call media from the first media session to the second media session; and responsive to shuffling the call media, to terminate the first media session.

According to yet another aspect of the specification, a mobile electronic device for initiating call handoff is provided, comprising: an input device for receiving input data indicative of a command to provide call handoff options, and for receiving further input data indicative of a command to move an ongoing call from a first transport to a second transport; a display device for generating representations of data; a memory; a communications interface for transmitting a call handoff request; and a processor interconnected with the display device, the memory and the communications interface, the processor configured to monitor available transports; receive the input data from the input device; to control the display device to generate a representation of at least one call handoff option based on the results of the monitoring; to receive the further input data; and to cause the communications interface to transmit the call handoff request.

A further aspect of the specification provides a mobile electronic device comprising: a processor and a communications interface, the processor enabled to: while the communications interface is engaged in a first media session with a remote communication device over a first transport via a communication network: determine that a second transport is available; establish a reflected media session via an echo server over the second transport; evaluate quality of the reflected media session by determining a call metric based on call transport data received at the mobile electronic device from the mobile electronic device (itself) in the reflected media session; and request call handover from the first media session to a second media session over the second transport when the call metric indicates that the quality of the reflected media session meets a threshold.

The reflected media session can be terminated after the quality of the reflected media session is evaluated.

The first media session can be terminated after handover occurs from the first transport to the second transport.

The first transport can be one of a Wi-Fi transport and a mobile transport, and the second transport can be the other of the Wi-Fi transport and the mobile transport.

The first transport can be a mobile transport and the second transport can be a Wi-Fi transport, and the call transport data can comprise an RTP (Real-time Transport Protocol) stream transmitted from the mobile electronic device to the echo server and back to the mobile electronic device over the Wi-Fi transport and through the communication network.

The call metric can comprise a measure of at least one of jitter and packet loss of returned call transport data.

The call transport data can comprise predetermined media data stored in a memory of the mobile electronic device, and the call metric is based on comparing the predetermined media data with returned media data received in returned call transport data.

To establish the reflected media session, the processor can be further enabled to transmit a request to the echo server to establish the reflected media session.

Yet a further aspect of the specification provides a method comprising: while a communications interface of a mobile electronic device is engaged in a first media session with a remote communication device over a first transport via a communication network, determining that a second transport is available; establishing a reflected media session between the mobile electronic device over the second transport via an echo server; evaluating quality of the reflected media session by determining a call metric based on call transport data received at the mobile electronic device from the mobile electronic device (itself) in the reflected media session; and requesting call handover from the first media session to a second media session over the second transport when the call metric indicates that the quality of the reflected media session meets a threshold.

The reflected media session can be terminated after the quality of the reflected media session is evaluated. The first media session can be terminated after handover occurs from the first transport to the second transport. The first transport can be one of a Wi-Fi transport and a mobile transport, and the second transport can be the other of the Wi-Fi transport and the mobile transport. The first transport can be a mobile transport and the second transport can be a Wi-Fi transport, and the call transport data can comprise an RTP (Real-time Transport Protocol) stream transmitted from the mobile electronic device to the echo server and back to the mobile electronic device over the Wi-Fi transport and through the communication network. The call metric can comprise a measure of at least one of jitter and packet loss of returned call transport data. The call transport data can comprise predetermined media data stored at a memory of the mobile electronic device, and the call metric is based on comparing the predetermined media data with returned media data received in returned call transport data.

Establishing the reflected media session can comprise transmitting a request from the mobile electronic device to the echo server to establish the reflected media session with itself.

Another aspect of the specification provides a computer program product, comprising a computer usable medium having a computer readable program code adapted to be executed to implement a method comprising: while a communications interface of a mobile electronic device is engaged in a first media session with a remote communication device over a first transport via a communication network, determining that a second transport is available; establishing a reflected media session between the mobile electronic device over the second transport via an echo server; evaluating quality of the reflected media session by determining a call metric based on call transport data received at the mobile electronic device from the mobile electronic device (itself) in the reflected media session; and requesting call handover from the first media session to a second media session over the second transport when the call metric indicates that the quality of the reflected media session meets a threshold. The computer program product can be non-transitory.

Yet another aspect of the specification provides an echo server comprising: a processor and a communications interface, the processor enabled to: receive via a communication network and the communications interface a request from a mobile electronic device to establish a reflected media session with the mobile electronic device (itself) via the echo server; and, cause call transport data from the mobile electronic device to be reflected back to the mobile electronic device for evaluation at the mobile electronic device.

The echo server can further comprise a server for managing call handoff, and the processor can be further enabled to: receive a second request via the communications interface from the mobile electronic device to initiate handover of a first media session between the mobile electronic device and a private branch exchange (PBX) from a first transport to a second transport, the reflected media session established over the second transport; terminate the reflected media session; establish a second media session with the mobile electronic device over the second transport; shuffle call media from the first media session to the second media session; and responsive to shuffling the call media, terminate the first media session. The processor can be further enabled to transmit a message to the mobile electronic device via the communications interface, the message indicating that the handover completed successfully. The first transport can be a mobile transport and the second transport can be a Wi-Fi transport, and the processor can be further enabled to establish the second media session by: transmitting a session invitation message to the mobile electronic device; and receiving an acknowledgement message from the mobile electronic device, the acknowledgement message including device session definition parameters. The processor can be further enabled to shuffle call media by transmitting the device session definition parameters to the PBX. The processor can be further enabled to shuffle call media by receiving line session definition parameters from the PBX and transmitting the line session definition parameters to the mobile electronic device. The first transport can be a Wi-Fi transport and the second transport can be a mobile transport, and the processor can be further configured to establish the second media session by: transmitting a command to the PBX for causing the PBX to initiate a call to the mobile electronic device over the mobile transport; and receiving an acknowledgement message from the PBX, the acknowledgement message including device session definition parameters. The processor can be further configured to shuffle call media by transmitting a request for line session definition parameters to the PBX. The processor can be further configured to shuffle call media by receiving line session definition parameters from the PBX via a line interface, transmitting the line session definition parameters to the PBX via a trunk interface, receiving refreshed trunk session definition parameters from the PBX via the trunk interface, and transmitting the refreshed trunk session definition parameters to the PBX via the line interface.

A further aspect of the specification provides a method comprising: receiving, at an echo server via a communication network and a communications interface, a request from a mobile electronic device to establish a reflected media session with itself via the echo server; and, causing call transport data from the mobile electronic device to be reflected back to the mobile electronic device for evaluation at the mobile electronic device.

The echo server can further comprise a server for managing call handoff, and the method can further comprise: receiving a second request via the communications interface from the mobile electronic device to initiate handover of a first media session between the mobile electronic device and a private branch exchange (PBX) from a first transport to a second transport, the reflected media session established over the second transport; terminating the reflected media session; establishing a second media session with the mobile electronic device over the second transport; shuffling call media from the first media session to the second media session; and responsive to shuffling the call media, terminating the first media session The method can further comprise transmitting a message to the mobile electronic device via the communications interface, the message indicating that the handover completed successfully. The first transport can be a mobile transport and the second transport can be a Wi-Fi transport, and the method can further comprise establishing the second media session by: transmitting a session invitation message to the mobile electronic device; and receiving an acknowledgement message from the mobile electronic device, the acknowledgement message including device session definition parameters. The method can further comprise shuffling call media by transmitting the device session definition parameters to the PBX. The method can further comprise shuffling call media by receiving line session definition parameters from the PBX and transmitting the line session definition parameters to the mobile electronic device. The first transport can be a Wi-Fi transport and the second transport can be a mobile transport, and the method can further comprise establishing the second media session by; transmitting a command to the PBX for causing the PBX to initiate a call to the mobile electronic device over the mobile transport; and receiving an acknowledgement message from the PBX, the acknowledgement message including device session definition parameters. The method can further comprise shuffling call media by transmitting a request for line session definition parameters to the PBX. The method can further comprise shuffling call media by receiving line session definition parameters from the PBX via a line interface, transmitting the line session definition parameters to the PBX via a trunk interface, receiving refreshed trunk session definition parameters from the PBX via the trunk interface and transmitting the refreshed trunk session definition parameters to the PBX via the line interface.

A further aspect of the specification provides a computer program product, comprising a computer usable medium having a computer readable program code adapted to be executed to implement a method comprising: receiving, at an echo server via a communication network and a communications interface, a request from a mobile electronic device to establish a reflected media session with itself via the echo server; and, causing call transport data from the mobile electronic device to be reflected back to the mobile electronic device for evaluation at the mobile electronic device. The computer program product can be non-transitory.

FIG. 1 depicts a system 100 for managing calls over various transports. It will now be apparent that although reference may be made herein to "calls," the described systems and methods are applicable to session-based communications in general and not limited to voice calls. It will also be appreciated that the systems and methods need not be limited to sessions and may also be applicable to messaging-based communications in some embodiments.

System 100 includes a mobile electronic device 104, which in the present embodiment is based on the computing environment and functionality of a hand-held wireless communication device. It will be understood, however, that mobile electronic device 104 is not limited to a hand-held wireless communication device. Other mobile electronic devices are possible, such as cellular telephones, smart telephones, Personal Digital Assistants ("PDAs"), media or MP3 players, laptop computers and the like.

Figure 2:
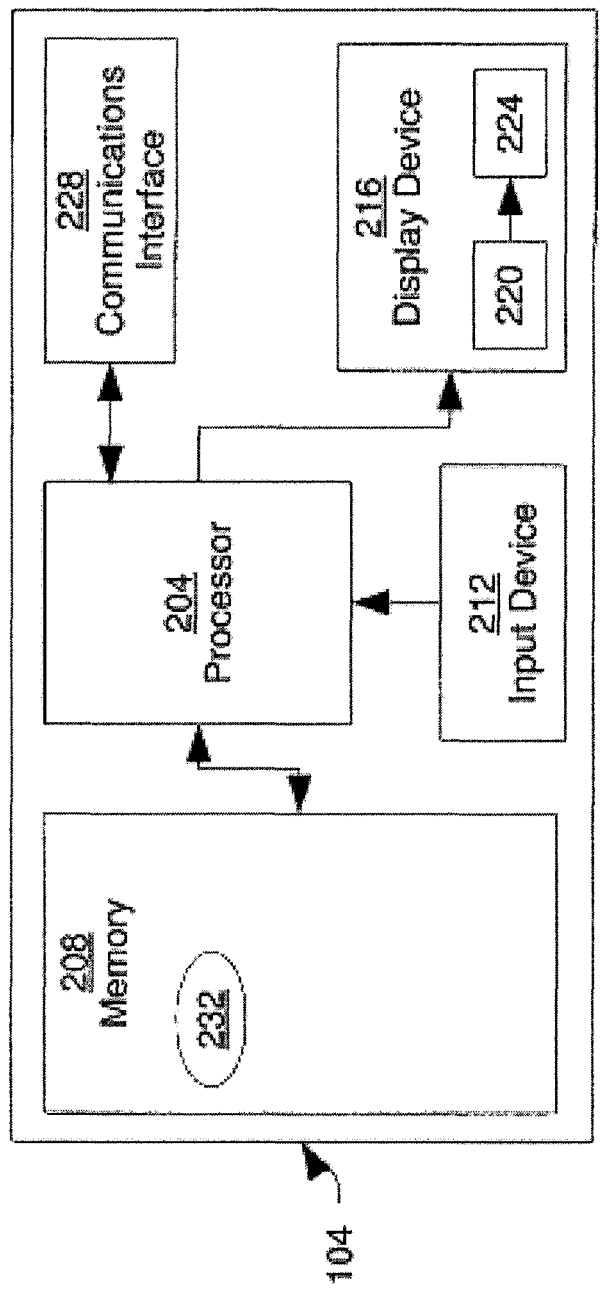
FIG. 2 depicts a schematic block diagram of the mobile electronic device of FIG. 1, according to a non-limiting embodiment.

Referring now to FIG. 2, certain internal components of mobile electronic device 104 are shown in greater detail. Mobile electronic device 104 includes a processor 204 interconnected with a memory 208. Memory 208 can comprise any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. Mobile electronic device 104 also includes an input device 212 interconnected with processor 204. Input device 212 is generally configured to provide input data to processor 204 and can include any suitable one of, or combination of, keypads, microphones, touch screens and the like.

Mobile electronic device 104 also includes a display device 216. Display device 216 includes display circuitry 220 for generating representations, such as representation 224, of data. Display device 216 and circuitry 220 can be controlled by processor 204 for generating representations. It will now be apparent that display device 216 can include any suitable one of, or combination of, a flat panel display (e.g. Liquid Crystal Display (LCD), Organic Light Emitting Diode (OLED), plasma), a Cathode Ray Tube (CRT) display, and the like. It will also now be apparent that in some embodiments input device 212 can be a touch screen integrated with display device 216. Circuitry 220 can include any suitable combination of circuitry for controlling the relevant combination of flat panel display, CRT display and the like. Circuitry 220 can therefore include, but is not limited to, display buffers, transistors, LCD cells, plasmas cells, phosphors, electron beam controllers and the like. As will be appreciated by those skilled in the art, display buffers can comprise memories into which data is loaded from memory 208 for generation of representations by display device 216.

Mobile electronic device 104 also includes a communications interface 228 interconnected with processor 204. Communications interface 228 allows mobile electronic device 104 to communicate with other computing devices via links 108 and 112 and their respective networks. It will be understood that communications interface 228 can therefore be selected for compatibility with links 108 and 112 as well as with networks 116 and 120.

Mobile electronic device 104 can also include various other components. For example, output devices (not shown) such as a speaker, a light-emitting indicator such as a Light Emitting Diode (LED), a motor for vibrational output, and the like, are all contemplated. The various components of mobile electronic device 104 are interconnected, for example via a communication bus (not shown). Mobile electronic device 104 can be powered by a battery (not shown).

Mobile electronic device 104 can include a phone application 232 maintained in memory 208. Phone application 232 can comprise computer readable instructions for execution by processor 204. In general, processor 204 can be configured, by execution of phone application 232, to perform various actions as discussed below.

Returning to FIG. 1, mobile electronic device 104 is operable to communicate over one or both of a first wireless link 108 based on a Wireless Local Area Network (WLAN, i.e. Wi-Fi) transport (in general, a transport based on the Institute of Electrical and Electronic Engineers ("IEEE") 802.11 standards) and a second wireless link 112 based on a mobile transport (such as, for example, Global System for Mobile communications ("GSM"), General Packet Radio Service ("GPRS"), Enhanced Data rates for GSM Evolution ("EDGE"), Code Division Multiple Access ("CDMA") and the third-generation mobile communication system (3G)).

Link 108 connects mobile electronic device 104 to a Wide Area Network (WAN) 116 such as the Internet, while link 112 connects mobile electronic device 104 to a Public Land Mobile Network (PLMN) 120. It will be appreciated that networks 116 and 120 can also be connected, for example via a link 123. It will be understood that links 108 and 112 each include any access points and/or base stations, and backhaul links necessary to connect mobile electronic device 104 to networks 116 and 120, respectively.

System 100 also includes a Local Area Network (LAN) 124, such as an enterprise intranet, which can be accessible from WAN 116 via a link 128 and a firewall 132. Connected to LAN 124 via respective links 136 and 140 are an enterprise server 144 and a Private Branch exchange (PBX) 148. It will be understood that although it is simply referred to as "PBX" herein, in some embodiments PBX 148 can be an IP (Internet Protocol) PBX. In addition to LAN 124, PBX 148 can be connected to the Public Switched Telephone Network (PSTN) 152 via a' link 156. It will now be apparent that PBX 148 can also communicate with PLMN 120 via link 156, PSTN 152 and a further link 160. PBX 148 can also be connected to any number of enterprise-associated telephone sets, such as telephone set 162, which can be digital or analog.

System 100 also includes a Session Management Platform (SMP) 164 connected to enterprise server 144 via a link 168 and to PBX 148 via a link 172. SMP 164 and enterprise server 144 can each be based on any suitable server environment. Thus, referring to FIG. 3, in some embodiments SMP 164 can comprise one or more processors, such as processor 304. SMP 164 also includes a memory 308 interconnected with processor 304, which can comprise any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. SMP 164 also includes a communications interface 312 interconnected with processor 304. In general, communications interface 312 allows SMP 164 to communicate with other computing devices and networks via links 168 and 172. It will be understood that communications interface 312 can therefore be selected for compatibility with links 168 and 172 and any associated networks.

SMP 164 also includes a call control application 316, which can be maintained in memory 308. Call control application 316 can comprise computer readable instructions for execution by processor 304. In general, processor 304 can be configured, via execution of call control application 316, to extend various features of enterprise telephony to mobile electronic device 104 by exerting control over PBX 148. For example, SMP 164 and PBX 148 can allow mobile electronic device 104 to perform functions akin to those normally available on a standard office telephone, such as telephone set 162. Examples of such features include, but are not limited to, direct extension dialling, enterprise voice mail, conferencing, call transfer, call park and the like.

SMP 164 can act to manage calls in which mobile electronic device 104 participates by controlling, or managing, call sessions at PBX 148 over link 172. In some embodiments, call sessions can be controlled (that is, created, modified and terminated) by processor 304 of SMP 164 using the Session Initiation Protocol (SIP) to communicate with PBX 148. In such embodiments, link 172 includes two SIP interfaces: a SIP-Trunk (SIP-T) interface and a SIP-Line (SIP-L) interface. The SIP-T interface can be used by SMP 164 to manage the call session between PBX 148 and mobile electronic device 104, while the SIP-L interface can be used by SMP 164 to manage the call session, or sessions, between PBX 148 and the other party or parties to the call. It will be appreciated that such other parties may comprise any combination of telephones internal to LAN 124, such as telephone 162, other devices which are not associated with the enterprise (e.g. mobile electronic devices, telephones, personal computers executing telephony applications), and the like.

Turning now to FIGS. 4 to 7, the general operation of the system 100 will be discussed, although it is recognized that the present system is not limited to the processes discussed herein. The signalling descriptions that follow are based on a "Third Party Call Control" architecture, in which SMP 164 handles call control but not call media. It will be appreciated that similar but slightly modified signalling may be used in a "First Party Call Control" architecture, in which the PBX 148 passes media through to the SMP 164 for direct media handling by the SMP 164. Variations in the signalling to adapt to various architectures will be appreciated by those skilled in the art.

Figure 4:
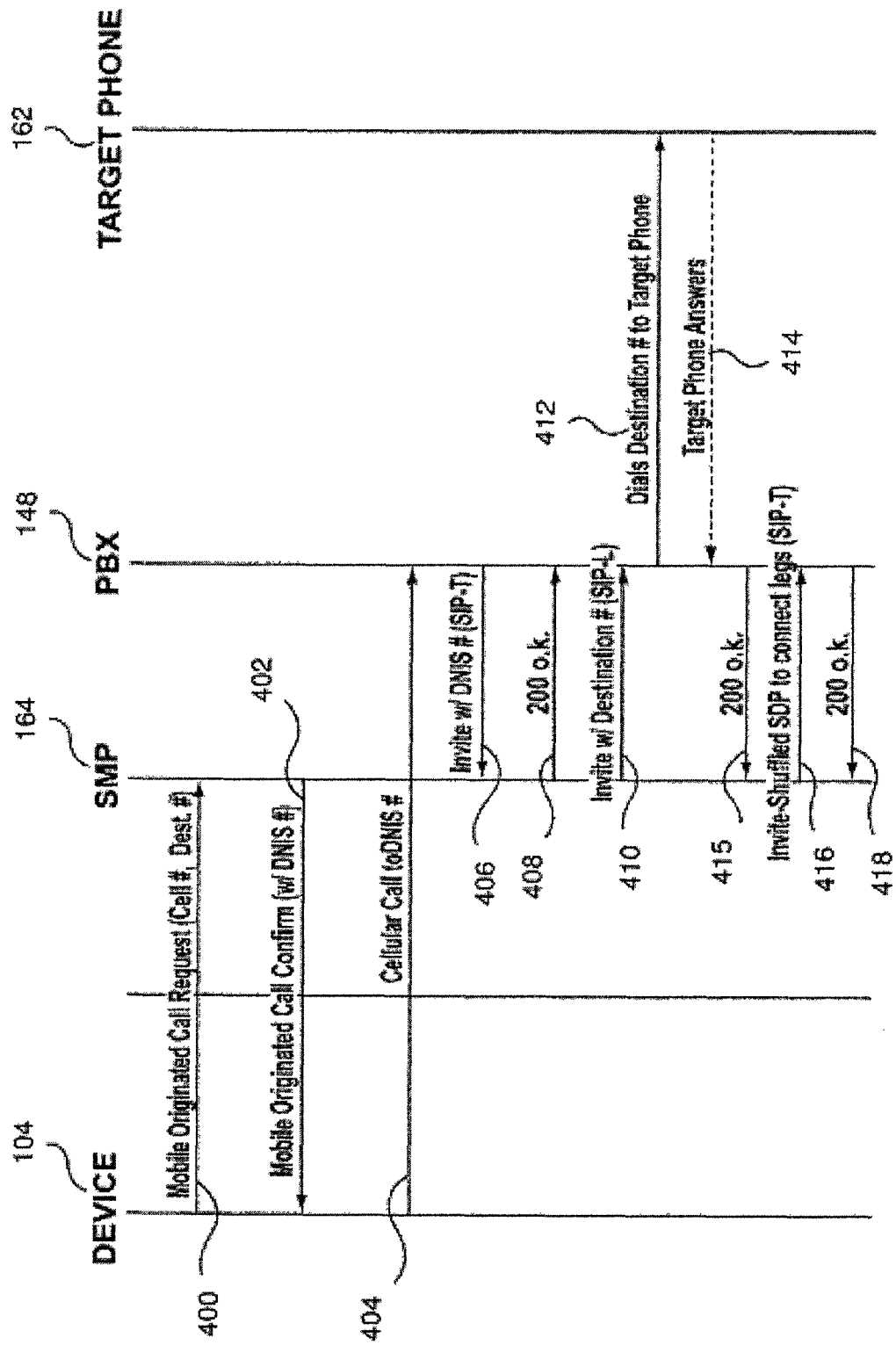
FIG. 4 depicts a signalling diagram generally indicating how mobile-originated, mobile-initiated calls are processed by the system of FIG. 1, according to a non-limiting embodiment.

FIG. 4 provides a signalling diagram for a call originating from mobile electronic device 104 to a target phone, such as telephone 162 (which will hereinafter be referred to as both telephone 162 and target phone 162), connected to PBX 148. First, mobile electronic device 104 sends a mobile originated call request with its cellular number and the destination number of target phone 162 to SMP 164 (block 400). In some embodiments, the mobile originated call request may be sent through enterprise server 144. In other embodiments, the call request may be sent via PLMN 120 and PSTN 152 through PBX 148, for example as an SMS message or using another messaging operation. SMP 164 confirms the call request by sending the Dialled Number Identification Service (DNIS) number to mobile electronic device 104 (block 402). Next, mobile electronic device 104 makes a cellular call using the DNIS number, which is received by PBX 148 (block 404). As the DNIS has been configured in PBX 148 to be routed to SMP 164 via the SIP-T interface of link 172, in response to the incoming call, PBX 148 sends an invite over SIP-T with the DNIS number to SMP 164 (block 406). SMP 164 matches the incoming call with the expected call from the mobile, and if correct, acknowledges the invite by sending a 200 OK signal to PBX 148, indicating that the mobile call leg is established (block 408).

SMP 164 then sets up the outgoing call leg to the destination. It does this by sending an invite over SIP-L to PBX 148 with the destination number of the target phone (block 410). SIP-L is used so that the call can be correctly attributed to the individual within the organization within any call records that are being maintained by PBX 148. When the invite is received, PBX 148 dials the destination number to target phone 162 (block 412), and target phone 162 answers the call (block 414). When target phone 162 is answered, PBX 148 sends a 200 OK signal to SMP 164 indicating that target phone 162 is ready to receive media (block 415). SMP 164 then sends an invite over SIP-T to PBX 148 and shuffles the Session Description Protocol (SDP, as known to those skilled in the art) session to connect the call legs (block 416). When the call legs are connected, PBX 148 sends a second 200 OK signal to SMP 164 (block 418), and mobile electronic device 104 and target phone 162 can communicate with each other.

Note that between the cellular call leg being established and the outgoing call leg being answered, ringing tones are provided to mobile electronic device 104. These ringing tones may be provided by PBX 148 using the presentation of early media from the outgoing call leg, or they may be generated locally on mobile electronic device 104 if early media is not available. In the latter case, it will be necessary to localize the ringing tone to match the tone normally provided with a call through PBX 148.

Figure 5:
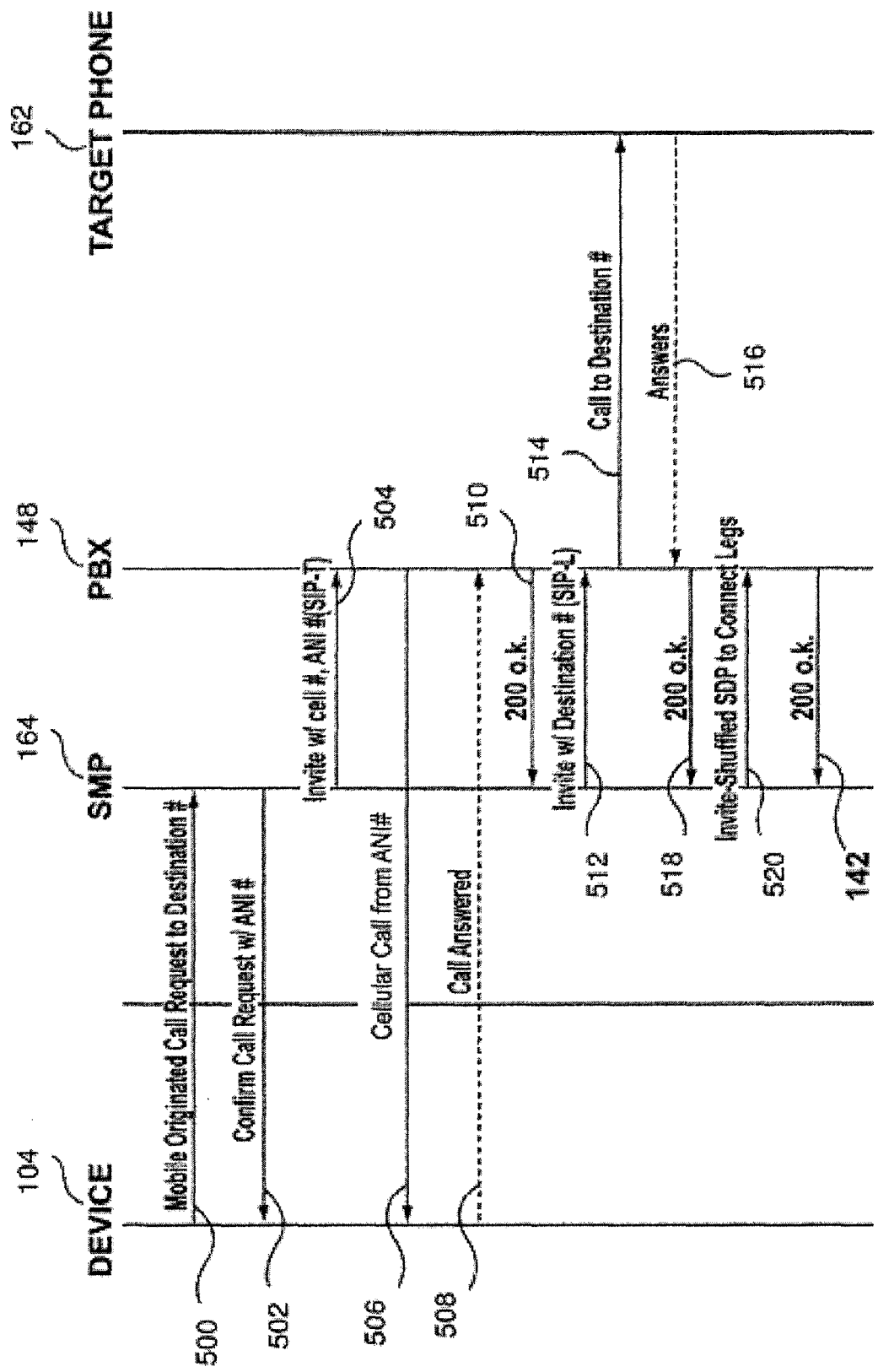
FIG. 5 depicts a signalling diagram generally indicating how mobile-originated, PBX (Private Branch Exchange)-initiated, calls are processed by the system of FIG. 1, according to a non-limiting embodiment.

The above description is known as a "mobile initiated" call, because SMP 164 provides mobile electronic device 104 with the DNIS number into which mobile electronic device 104 has called. Alternatively, the mobile originated call could be "PBX initiated", as shown in FIG. 5. Specifically, in a PBX-initiated call, upon receipt of the mobile originated call request (block 500), SMP 164 confirms receipt of the call to mobile electronic device 104 with an Automatic Number Identification (ANI) number (block 502), which mobile electronic device 104 uses to identify the incoming call from PBX 148. SMP 164 then sends an invite over SIP-T to PBX 148 with the cellular number of mobile electronic device 104 and the ANI number that is attached to the outgoing call (block 504). Upon receipt of the invite, PBX 148 makes a cellular call to mobile electronic device 104 (block 506), which is answered by mobile electronic device 104 (block 508). Mobile electronic device 104 checks the ANI number in the incoming call to confirm if the number is actually from PBX 148. If the ANI number is stripped for any particular reason, then mobile electronic device 104 can be configured to answer the call as a regular cellular call, or to reject the call as unknown. When mobile electronic device 104 answers the PBX-initiated call, PBX 148 sends a 200 OK signal to SMP 164, indicating that the call leg to the device is established (block 510).

In response, SMP 164 sends an invite over SIP-L with the destination number of target phone 162 to PBX 148 (block 512). When the invite is received at PBX 148, PBX 148 dials the destination number to target phone 162 (block 514), target phone 162 picks up the call (block 516), and a 200 OK signal is sent from PBX 148 to SMP 164 (block 518), indicating that target phone 162 is also ready to receive call media. In response to the 200 OK, SMP 164 sends an invite to PBX 148, shuffling the SDP session to connect the call legs (block 520). Finally, when the call legs are connected, PBX 148 sends a second 200 OK signal to SMP 164, and mobile electronic device 104 and target phone 162 are able to communicate with each other.

In both the above instances, SMP 164 is performing third party call control of the two call legs, with SMP 164 remaining in control of the call. The decision of whether to proceed with a mobile-initiated call or a PBX-initiated call can be set by policy. Specifically, the option to select either mobile-initiated or PBX-initiated calls is a feature provided in SMP 164, and an administrator for LAN 124 can determine which setting to use. For example, in some cases it may be more cost effective for an enterprise to utilize PBX-initiated calls rather than mobile-initiated calls, and vice versa. However, it is appreciated that system 100 is not limited to the above processes.

Figure 6:
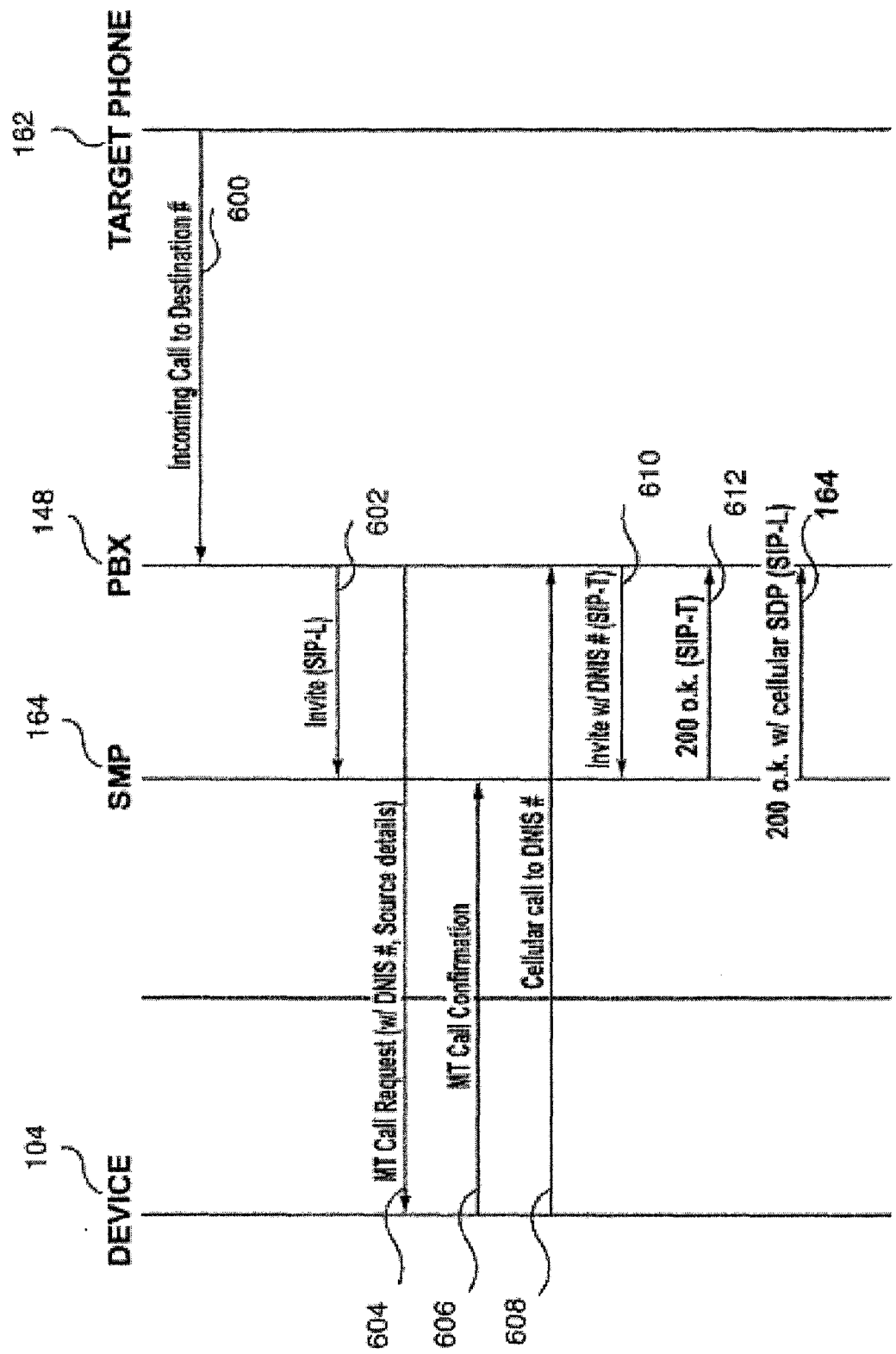
FIG. 6 depicts a signalling diagram generally indicating how mobile-terminated, mobile-initiated calls are processed by the system of FIG. 1, according to a non-limiting embodiment.
Figure 7:
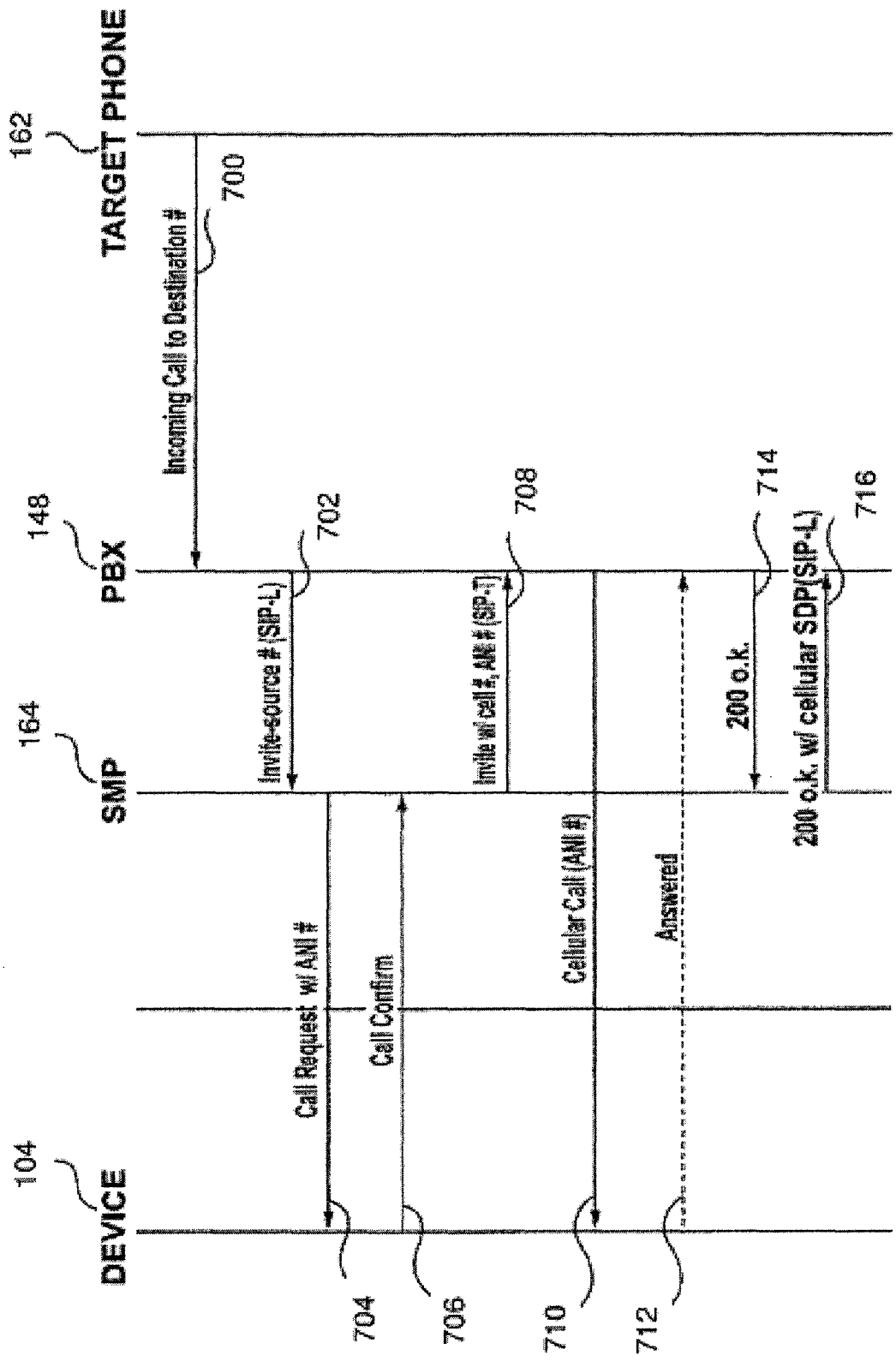
FIG. 7 depicts a signalling diagram generally indicating how mobile-terminated, PBX-initiated calls are processed by the system of FIG. 1, according to a non-limiting embodiment.

FIGS. 6 and 7 are signalling diagrams illustrating a mobile terminated call utilizing SIP. Specifically, and for the purposes of this disclosure, telephone 162 is originating the call, which will send a call to mobile electronic device 104. Turning first to FIG. 6, an incoming call is made from target phone 162 to PBX 148 (block 600). When the call is received at PBX 148, PBX 148 sends an invite to SMP 164 over SIP-L (block 602).

In response to the invite, SMP 164 sends a call request with the DNIS number and source details to mobile electronic device 104 (block 604), which is confirmed to SMP 164 (block 606). In addition to confirming the call, mobile electronic device 104 sends a cellular call to the DNIS number at PBX 148 (block 608). Again, as the DNIS number is routed in the dialling plans to SMP 164, upon receipt of the cellular call, PBX 148 sends an invite over SIP-T to SMP 164 with the DNIS number (block 610). In response to the invite, a "200 OK" signal is sent over SIP-T from SMP 164 to PBX 148, acknowledging that the call leg to mobile electronic device 104 is established (block 612). Finally, the initial invite (block 602) is acknowledged with the "200 OK" signal containing the cellular SDP, at which point the call legs are joined and target phone 162 and mobile electronic device 104 can communicate with each other on the call.

The diagram shown in FIG. 6 illustrates a "mobile-initiated" call, because, as discussed above with respect to FIGS. 4 and 5, SMP 164 presents mobile electronic device 104 with the DNIS number at PBX 148 into which to call. However, it is also possible to employ a "PBX-initiated" mobile terminated call, as shown in FIG. 7, where PBX 148 sends an incoming call to mobile electronic device 104 with the ANI number of target phone 162.

Specifically, similar to the mobile-initiated call described above and shown in FIG. 6, target phone 162 sends an incoming call to the destination number of mobile electronic device 104, which is received at PBX 148 (block 700). Upon receipt of the call, PBX 148 sends an invite over SIP-L to SMP 164 (block 702) with the source number of target phone 162. In response to the invite, SMP 164 sends a call request with the source number to mobile electronic device 104 (block 704), with the ANI number mobile electronic device 104 should expect in the incoming call, the call request being confirmed by mobile electronic device 104 (block 706). At this point in the PBX-initiated call, SMP 164 sends an invite over SIP-T to PBX 148 with the cellular number and ANI number to use (block 708), prompting PBX 148 to make a cellular call to mobile electronic device 104 with the ANI number (block 710), prompting mobile electronic device 104 to ring. Mobile electronic device 104 answers the call (block 712), and a "200 OK" signal is sent from PBX 148 to SMP 164, acknowledging that the cellular call leg to mobile electronic device 104 is established (block 714). In response, a "200 OK" signal is also sent from SMP 164 to PBX 148, acknowledging that the call leg to target phone 162 is also established (block 716). SMP 164 shuffles the SDP session to connect the call legs, the call legs are joined, and target phone 162 and mobile electronic device 104 can communicate with each other on the call.

As discussed above with respect to FIGS. 4 and 5, SMP 164 remains in control of the signalling between target phone 162 and mobile electronic device 104 in both the mobile-initiated and PBX-initiated calls. Again, the decision to proceed with a mobile-initiated call or a PBX-initiated call is based on policy and may be set by a system administrator. In some cases, it may be more efficient or cost effective for the administrator to decide that PBX-initiated calls should be used, and in other cases, it may be more efficient or cost effective for mobile-initiated calls to be utilized. As these policy decisions may vary by organization and are not imperative to the scope of the present application, they will not be discussed in further detail.

Referring again to FIG. 1, it will now be apparent that mobile electronic device 104 can participate in the above-described calls via either one of links 108 (i.e. a Voice over WLAN, or VoWLAN, call) and 112 (i.e. a mobile or cellular call). When mobile electronic device 104 participates in a call via link 108, call media (e.g. voice streams, video streams and so on) is carried over link 108 to and from WAN 116 and over link 128 to and from LAN 124. Within LAN 124, call media can be carried over link 140 to and from PBX 148 for transfer to and from the other party or parties to the call. It will be appreciated that in some embodiments, call media can also travel to and from PBX 148 via SMP 164 and enterprise server 144. In such embodiments, SMP 164 can thus include media server functionality in addition to call control functionality.

When mobile electronic device 104 participates in a call via link 112, call media is carried over link 112 to and from PLMN 120. Call media can then be carried to and from PBX 148 via links 160 and 156. Call data (i.e. signalling) can be carried between mobile electronic device 104 and WAN 116 either via link 108, or via links 112 and 123. Call data can then be carried to and from SMP 164 via links 128, 136 and 168. Alternatively, call data can be carried to and from SMP 164 via a relay 176 connected to WAN 116 by a link 180 and to enterprise server 144 by a link 184. In other words, the path taken by call data is not necessarily the same as the path taken by call media. For instance, in some embodiments call media may only be permitted to travel over a mobile transport (i.e., links 112, 160 and 156) but call data may be free to travel over any transport. Additionally, in some embodiments call data can be carried between mobile electronic device 104 and SMP 164 over links 112, 160, 156 and 172. For example, some networks to which mobile electronic device 104 can connect for participating in a call will not allow mobile electronic device 104 to transmit both media and data simultaneously. In such networks, signalling for the call must be carried within the call media, for example as Dual-Tone Multi-Frequency (DTMF) tones.

Processor 204 of mobile electronic device 104 can be configured, via execution of phone application 232, to initiate a handoff (also referred to as a handover) of a call in which mobile electronic device 104 is participating. The handoff can result in a call being transferred from a first transport over which the call is proceeding (which can be one of a Wi-Fi transport and a mobile transport) to a second transport over which the call is to proceed following the handoff (which can be the other of the Wi-Fi transport and the mobile transport).

Figure 8:
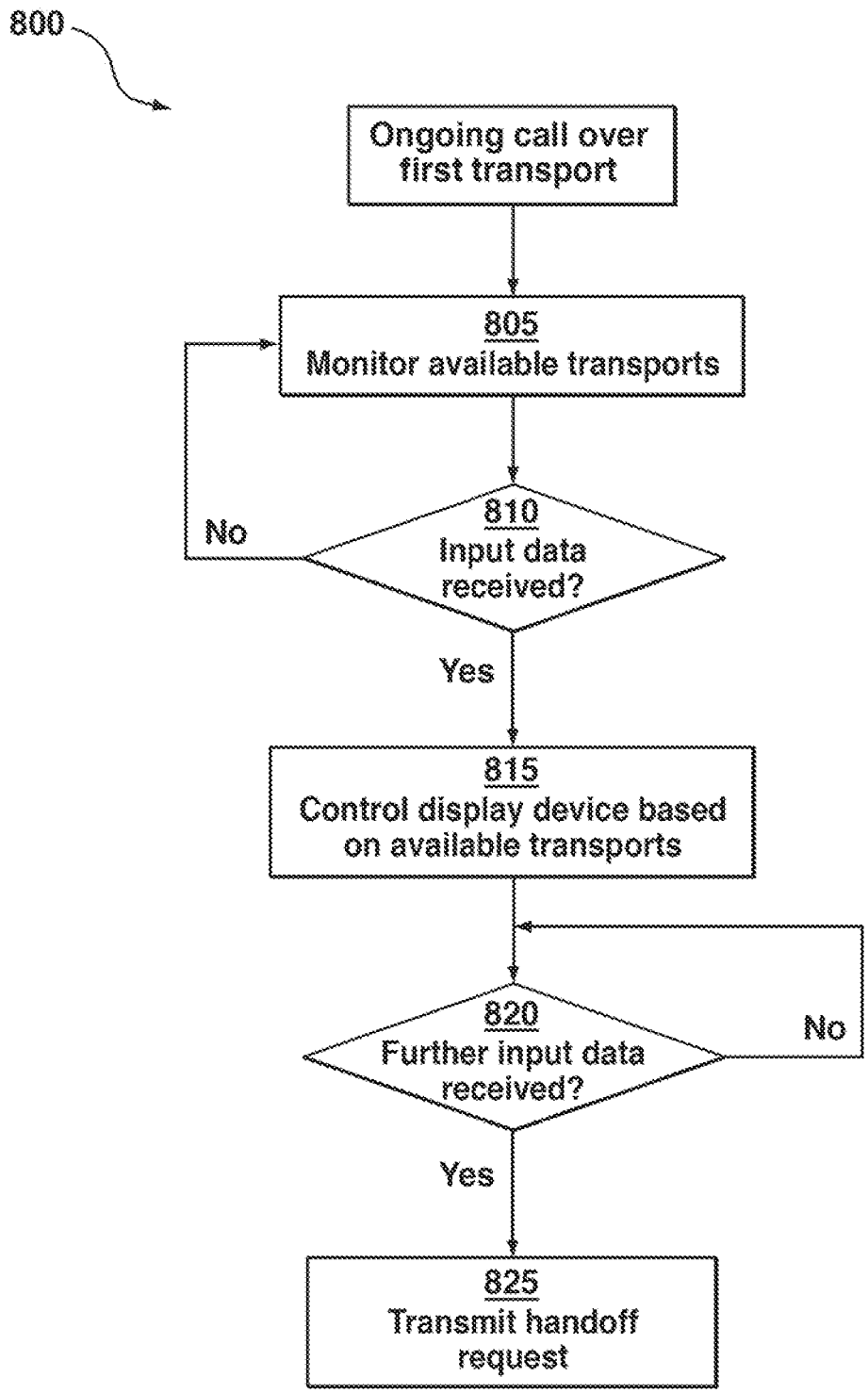
FIG. 8 depicts a method of initiating call handoff, according to a non-limiting embodiment.

Referring now to FIG. 8, a flowchart is depicted showing a method 800 of initiating call handoff between first and second transports. As seen in FIG. 8, processor 204 of mobile electronic device 104 can be configured to perform method 800 after a call has been initiated over a first transport. The call can be initiated, for example, according to any of the scenarios discussed above or variations thereto.

Beginning at block 805, processor 204 can be configured to monitor available transports. It will now be apparent that block 805 can be performed in conjunction with communications interface 228, which enables links 108 and 112 to be established and maintained. In the context of method 800, a transport is deemed to be "available" when it is currently ready for use in carrying a call. That is, a transport is available if a link to mobile electronic device 104 using that transport has been established and the link is determined by processor 204 to be usable in carrying a call. Processor 204 can determine if a link is usable or not by verifying, for example, whether mobile electronic device 104 has permission to use the link for a call, whether the link can be used to successfully communicate with enterprise server 144 and SMP 164, and so on. For example, some WLAN access points may only allow certain types of traffic to and from mobile electronic device 104, thus preventing links with those access points from being used for calls. In such situations, processor 204 would determine that the Wi-Fi transport is not available as part of the performance of block 805. Identifiers corresponding to the one or more transports deemed available at block 805 can be maintained in memory 208. Such identifiers can be plain text (e.g. "Wi-Fi" or "mobile"), numeric (e.g. "1" for Wi-Fi, "2" for mobile) and the like. Other suitable identifiers will also occur to those skilled in the art.

Figure 9:
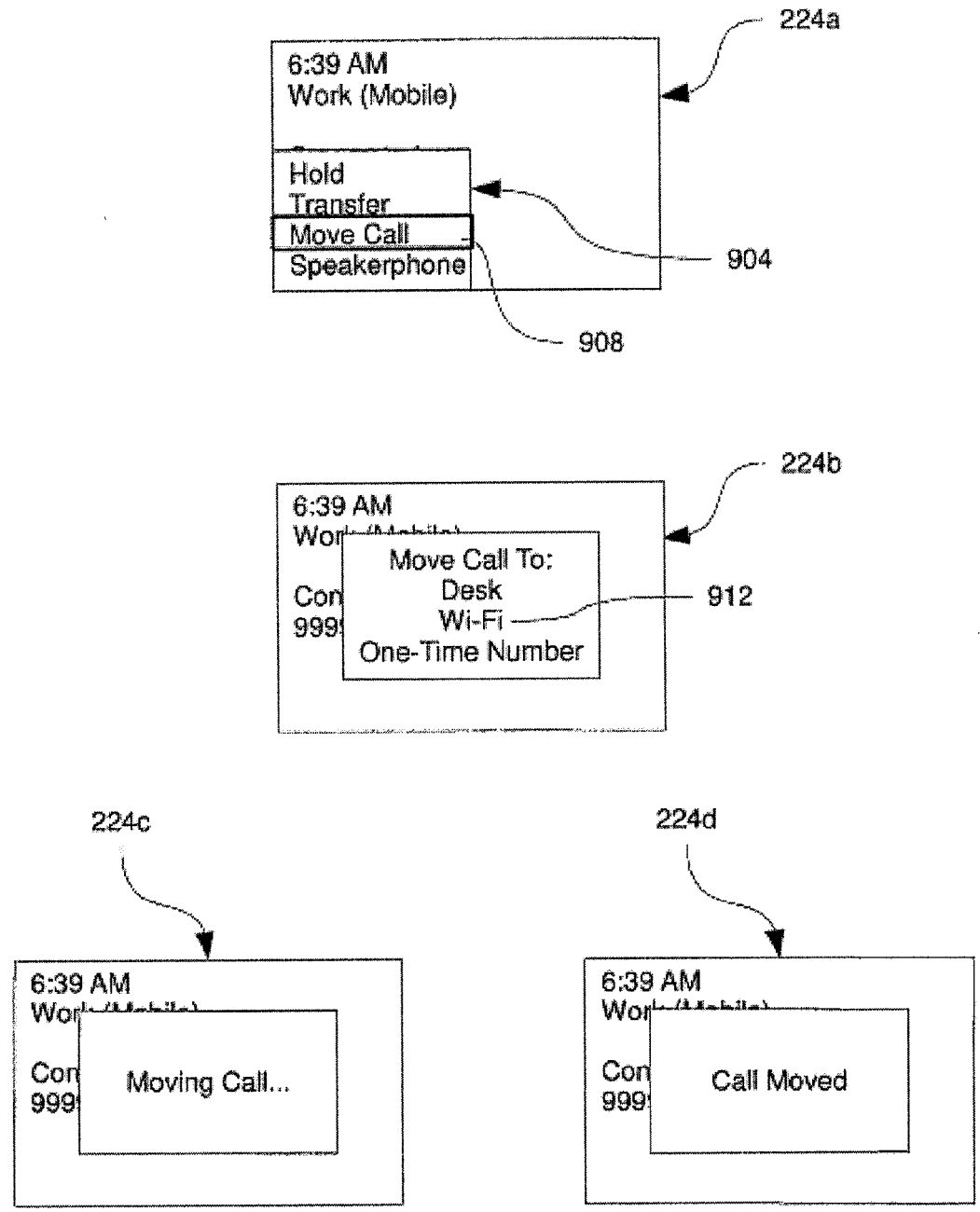
FIG. 9 depicts representations of data generated on a display of the mobile electronic device of FIG. 2, according to a non-limiting embodiment.

Proceeding to block 810, processor 204 determines whether input data has been received from input device 212 indicative of a selection of a "move call" command. Referring briefly to FIG. 9, a representation 224a generated by display device 216 under the control of processor 204 is shown. Representation 224a is a representation of data including a menu 904 (which, it will be appreciated, can be maintained in memory 208) with a "Move Call" option 908, shown selected in FIG. 9. If no input data reflecting a "move call" command is determined to have been received at block 810, processor 204 can return to block 805. If, however, the determination at block 810 is affirmative (that is, if a selection of option 908 has been made) then method 800 proceeds to block 815.

At block 815, processor 204 can be configured to control display device 216 to generate an updated representation based on the available transports detected at block 805. Referring again to FIG. 9, an exemplary representation 224b is shown, which is representative of menu data (which, again, can be maintained in memory 208) for various options relating to moving calls. For example, a "Desk" option can be provided to transfer the call from mobile electronic device 104 to a telephone (which can be similar to telephone 162) within LAN 124 that is associated with mobile electronic device 104. Additionally, an option 912 can be provided for handing the call over from the current transport over which call media is being carried (a mobile transport, in the example of FIG. 9) to another transport, such as a Wi-Fi transport. It will now be apparent that option 912 is not necessarily a Wi-Fi handoff option. For example, if the call is currently proceeding over a Wi-Fi transport and a mobile transport is available, option 912 can instead be a mobile handoff option. It will also be appreciated that if, at block 805, no other transports were determined to be available, option 912 can be omitted entirely. Option 912 can also be omitted if, for instance, mobile electronic device 104 does not have permission to use the call handoff feature.

Following performance of block 815, processor 204 proceeds to block 820, at which a determination is made as to whether further input data has been received. The further input data contemplated at block 820 comprises input data received from input device 212 and indicating a selection of option 912 shown in representation 224b. If the determination at block 820 is negative, processor 204 can wait at block 820 until an affirmative determination is made, or until other input data is received which ends method 800 (such as input data indicating selection of a "back" key). If the determination at block 820 is affirmative, method 800 proceeds to block 825.

At block 825, following selection of option 912 as shown in FIG. 9, processor 204 can be configured to transmit, via communications interface 228, a handoff request to SMP 164. Following transmission of the handoff request at block 825, processor 204 can further be configured to control display device 216 to generate an updated representation 224c as shown in FIG. 9.

Figure 10:
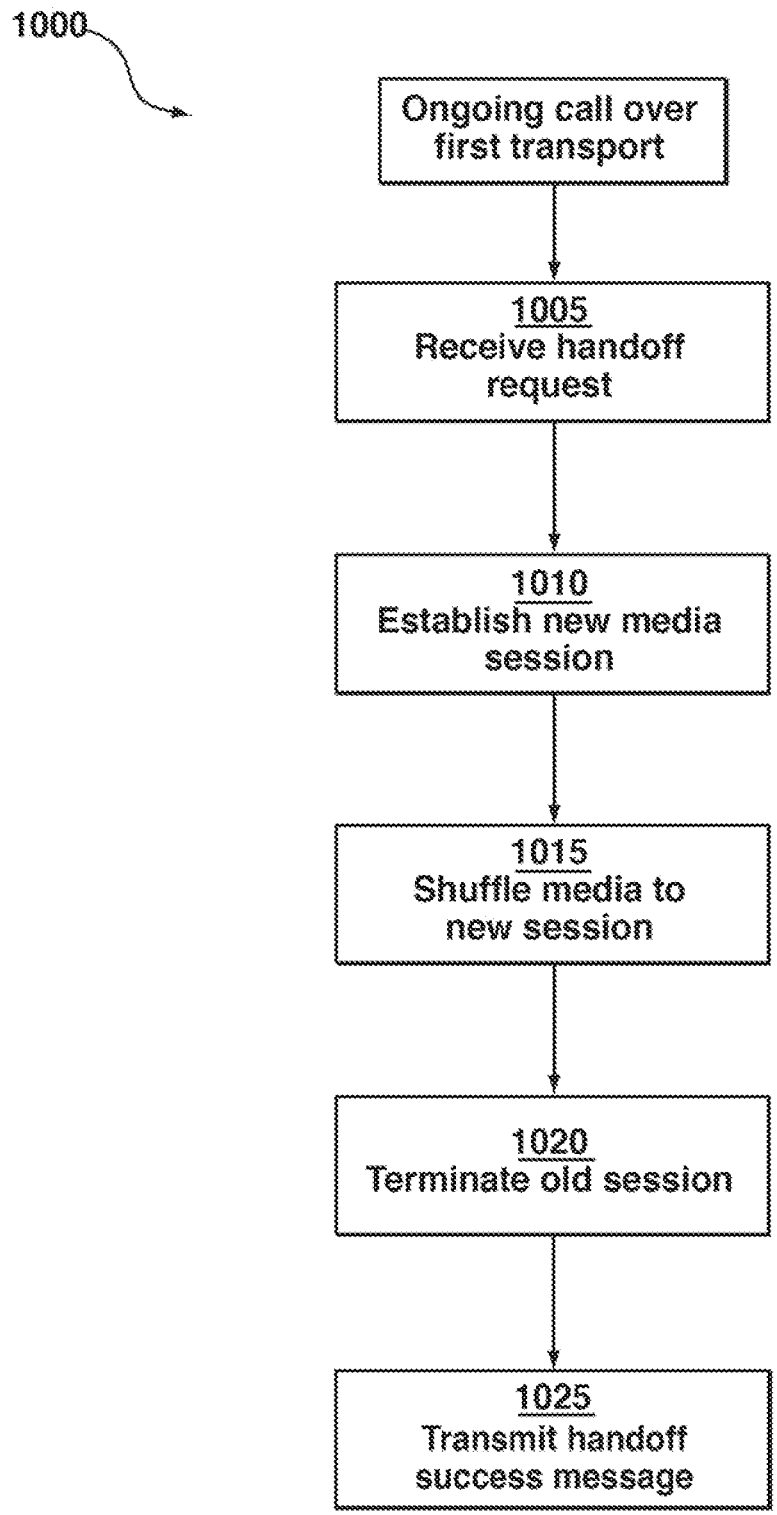
FIG. 10 depicts a method of managing call handoff, according to a non-limiting embodiment.

Turning now to FIG. 10, a flowchart of a method 1000 of managing call handoff at SMP 164 is depicted. Processor 304 of SMP 164 can be configured to perform method 1000 via execution of call control application 316 maintained in memory 308.

Performance of method 1000 begins at block 1005, at which processor 304 receives, via communications interface 312, a handoff request from mobile electronic device 104. It will be appreciated that the handoff request, being call data (i.e. signalling) can be carried to SMP 164 via a variety of combinations of links in system 100, as discussed above. The handover request can include an indication of which transport mobile electronic device 104 intends to move the call to.

Following the performance of block 1005, method 1000 proceeds to block 1010. At block 1010, processor 304 can be configured to establish a new media session with mobile electronic device 104. The new media session can be established over the transport to which the call is being handed off, and can be established between mobile electronic device 104 and PBX 148. It will be appreciated that in other embodiments where SMP 164 handles media as well as call control, the new media session can be established directly between SMP 164 and mobile electronic device 104.

Once the new media session has been established at block 1010, method 1000 proceeds to block 1015. At block 1015, processor 304 can be configured to shuffle media for the call from the existing or "old" session with mobile electronic device 104 to the new session established at block 1010. In general, performance of block 1015 involves transmitting media session parameters (for example, using SDP) to one or both of mobile electronic device 104 and PBX 148, as will be discussed in further detail below.

Following the successful shuffling of media from the existing media session to the new media session, method 1000 proceeds to block 1020, at which the existing media session is terminated or "torn down" by transmitting end notifications to one or both of mobile electronic devices 104 and PBS 148.

Performance of method 1000 concludes at block 1025, at which processor 304 can be configured to transmit a notification to mobile electronic device 104 indicating that the call handoff was successful. Following receipt of the handoff success message, the call can continue, uninterrupted or substantially uninterrupted, with media being carried to and from mobile electronic device 104 over the new transport. Referring briefly to FIG. 9, processor 204 of mobile electronic device 104 can be configured, via execution of phone application 232, to control display device 216 to generate an updated representation 224d following receipt of the handoff success message.

Figure 11:
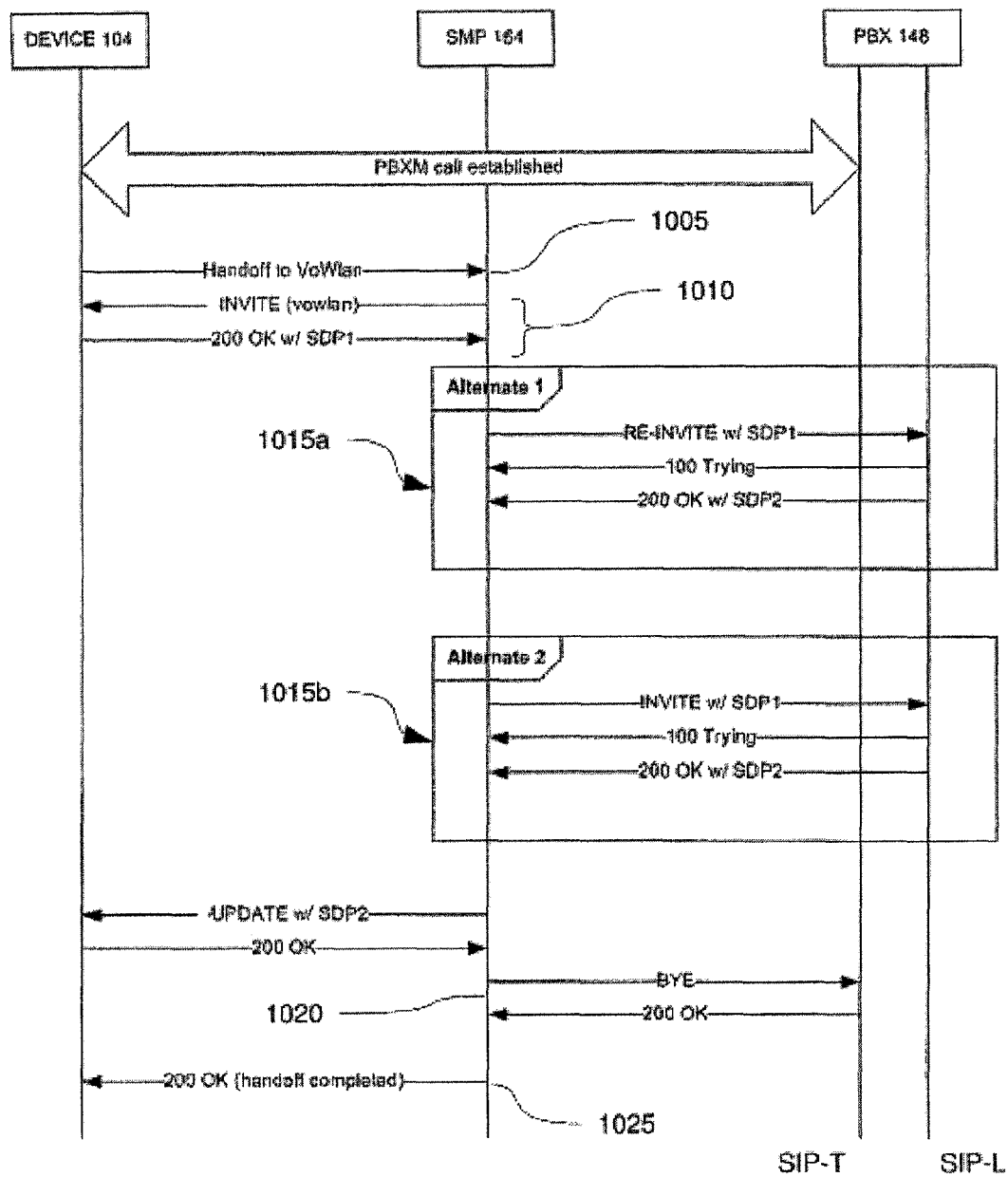
FIG. 11 depicts a signalling diagram for performance of the method of FIG. 10 in a call handoff from a mobile transport to a Wi-Fi transport.

Referring now to FIG. 11 an exemplary signal flow is depicted for the performance of method 1000 in a "rove-in" scenario, in which mobile electronic device 104 is participating in a mobile (also referred to as "PBXM") call over a mobile transport and initiates a handoff of the call media to a VoWLAN call over a Wi-Fi transport. Mobile electronic device 104 transmits a handoff request, which is received by SMP 164 at 1005. The handoff request contains an indication that mobile electronic device 104 intends to move the call media from the established mobile session between mobile electronic device 104 and PBX 148 to a VoWLAN session. SMP 164, in response to receiving the handoff request, sends an INVITE message to mobile electronic device 104 to establish a new Wi-Fi session. Mobile electronic device 104 responds by sending a 200 OK message including media session parameters ("SDP1," which can include a network address and port for mobile electronic media codec or codecs and media formats that mobile electronic device 104 intends to use, and the like).

Once the new media session with mobile electronic device 104 has been established, SMP 164 shuffles call media from the existing session to the new session and joins the new session with the media session between PBX 148 and the other call party or parties. Two alternatives (1015a and 1015b) for shuffling are shown. In general, SMP 164 sends either a "RE-INVITE" message via SIP-L with the session parameters from mobile electronic device 104 or an "INVITE" message with the session parameters from mobile electronic device 104. As a result of either alternative, PBX 148 sends a 200 OK message to SMP 164 including media session parameters that PBX 148 will use for the call leg between PBX 148 and (for example) target phone 162. Which alternative is used can be determined according to the capabilities of PBX 148. In particular, PBX 148 can be configured to relay DTMF tones to SMP 164 in case call data arrives via DTMF tones. Two mechanisms for relaying DTMF tones are generally relied upon: Keypad Stimulus Protocol (KPML) and "2833" (as defined in IEEE Request For Comments (RFC) 2833). When PBX 148 supports dynamic switching between KPML, which is used for mobile calls, and 2833, which is used for Wi-Fi calls, alternative 1015a can be used, as it allows for the re-use of the existing dialog between SMP 164 and PBX 148 for managing the media session with target phone 162. When PBX 148 does not support such dynamic switching, however, alternative 1015b can be used to set up a new dialog between SMP 164 and PBX 148.

Performance of block 1015 is concluded when SMP 164 sends an UPDATE message to mobile electronic device 104 which includes line media session parameters ("SDP2") which define the media session with the other party or parties to the call within PBX 148. Following receipt of the line media session parameters by mobile electronic device 104, mobile electronic device 104 is able to communicate with the other party over the Wi-Fi transport. SMP 164 then sends a BYE message over SIP-T to PBX 148 for causing PBX 148 to terminate the mobile session with mobile electronic device 104, which PBX 148 acknowledges with a 200 OK message. Finally, SMP 164 sends an indication to mobile electronic device 104 that the handoff was successful.

Figure 12:
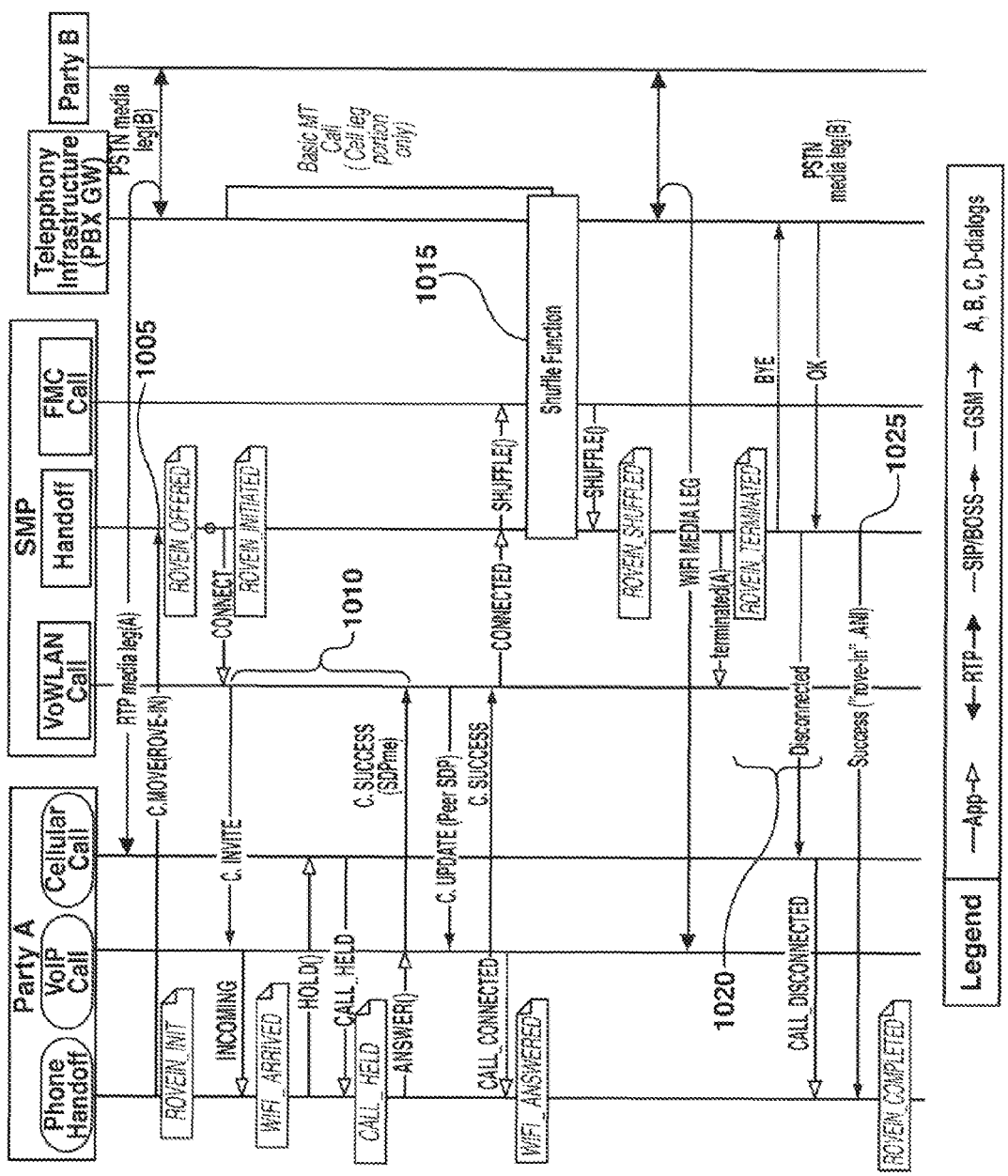
FIG. 12 depicts an additional signalling diagram for performance of the method of FIG. 10 in a call handoff from a mobile transport to a Wi-Fi transport.

Referring to FIG. 12, performance of method 1000 in the "rove-in" scenario is shown in further detail. It will now be apparent that "Party A" is mobile electronic device 104, and that the illustrated components within mobile electronic device 104—"Phone Handoff," "VoIP Call" and "Cellular Call"—can be processes or threads managed by processor 204 executing phone application 232. Thus, additional signalling is shown within mobile electronic device 104, in which, following receipt of the new session INVITE message from SMP 164 (1010), the phone handoff thread instructs the cellular call thread to place the existing mobile session on hold while the handoff is conducted. Similarly, SMP 164 is illustrated as having multiple processes or threads—a "VoWLAN Call" thread, a "Handoff" thread and a "FMC Call" thread (Fixed Mobile Convergence)—which can be managed substantially simultaneously by processor 304 executing call control application 316. For example, as part of the performance of block 1020, the Handoff thread within SMP 164 instructs the VoWLAN Call thread—which manages the media session with mobile electronic device 104—to end, while also instructing both PBX 148 and the Cellular Call thread of mobile electronic device 104 to tear down the existing mobile session.

Figure 14:
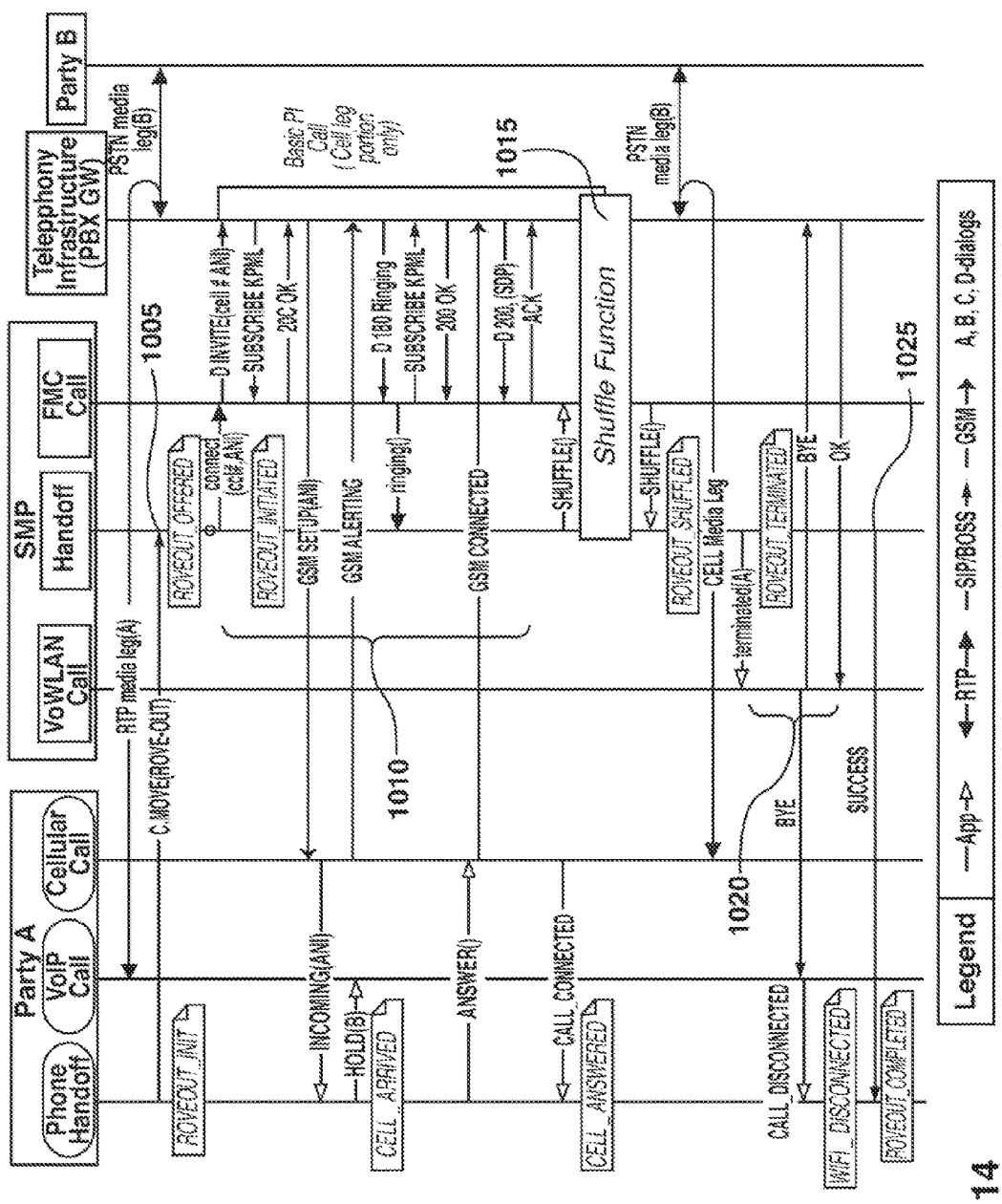
FIG. 14 depicts an additional signalling diagram for performance of the method of FIG. 10 in a call handoff from a Wi-Fi transport to a mobile transport.

It is noted that certain protocols are shown in FIGS. 12 and 14: SIP or SIP-like (for example, a binary protocol with SIP-like message structure) signalling between SMP 164 and mobile electronic device 104 and between SMP 164 and PBX 148, and Real-time Transport Protocol (RTP) between mobile electronic device 104 and PBX 148. It will be understood that these protocols are merely examples, and that other suitable protocols may occur to those skilled in the art.

Figure 13:
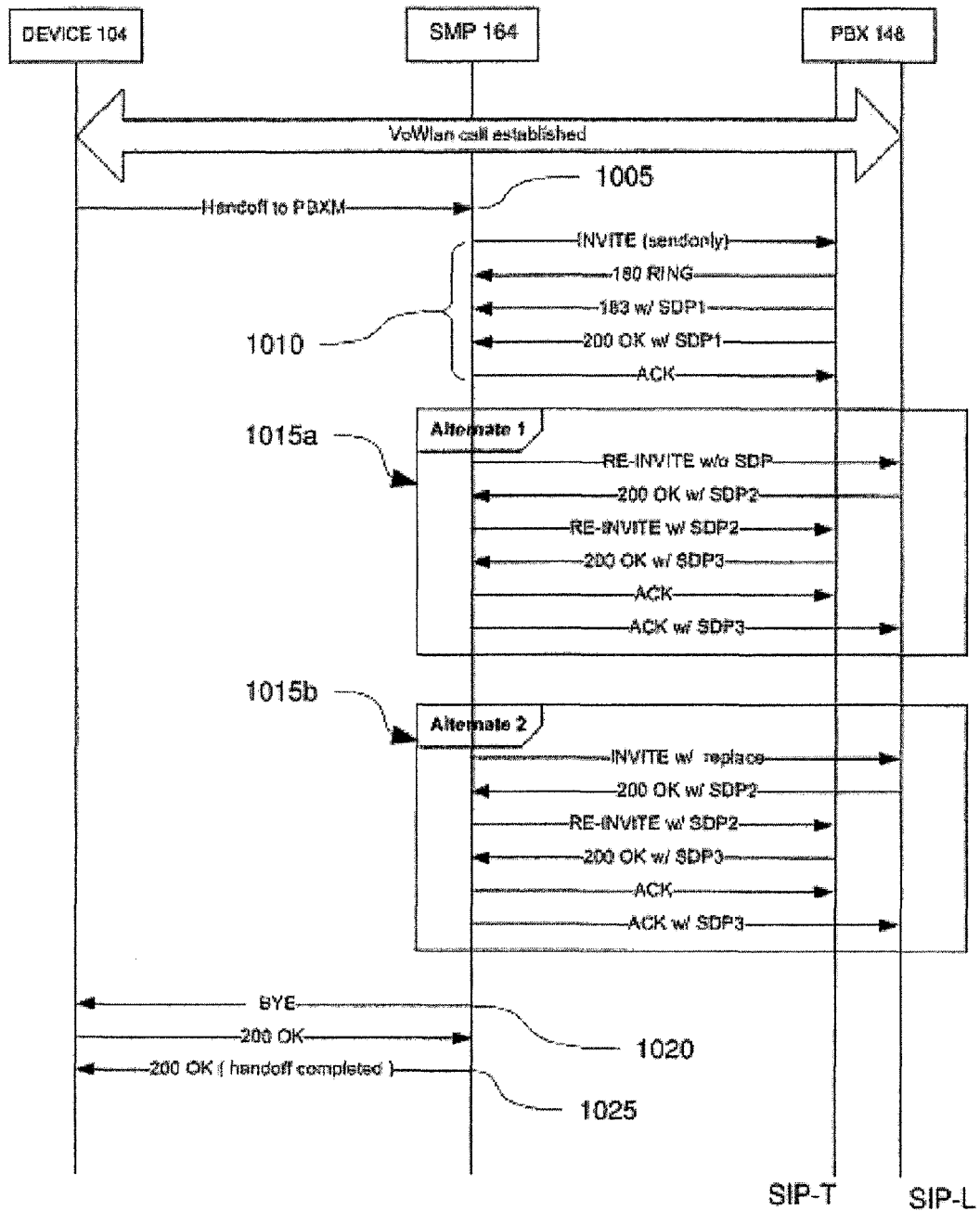
FIG. 13 depicts a signalling diagram for performance of the method of FIG. 10 in a call handoff from a Wi-Fi transport to a mobile transport.

Referring now to FIG. 13, an exemplary signal flow is depicted for the performance of method 1000 in a "rove-out" scenario, in which mobile electronic device 104 is participating in a VoWLAN call over a i-Fi transport and initiates a handoff of the call media to a mobile call. At 1005, SMP 164 receives a handoff request from mobile electronic device 104, including an indication that mobile electronic device 104 intends to move the ongoing call from a Wi-Fi transport to a mobile transport. At 1010, SMP 164 instructs PBX 148 to establish a new cellular session with mobile electronic device 104 via SIP-T. Referring to FIG. 14, it can be seen that SMP 164 transmits an INVITE message to PBX 148 including the cellular number of mobile electronic device 104 and an ANI number. This causes PBX 148 to place a cellular call, using GSM or any other suitable mobile transport, to mobile electronic device 102. As in the rove-in scenario, mobile electronic device 104 places the existing Wi-Fi session on hold to answer the incoming mobile call. While waiting for mobile electronic device 104 to answer the mobile call, PBX 148 sends a 180 RING message to SMP 164. Once the call has been answered by mobile electronic device 104, PBX 148 sends a 200 OK message via SIP-T including the trunk media session parameters ("SDP1" in FIG. 13) used by PBX 148 to manage the media session with mobile electronic device 104. As seen in FIG. 13, PBX 148 can also send a 183 message to SMP 164 with the trunk session parameters prior to sending the 200 OK message.

It is noted that during performance of block 1010 as seen in FIG. 14, PBX 148 and SMP 164 can each send SUBSCRIBE messages to the other to set up DTMF tone relaying between PBX 148 and SMP 164. This ensures that in the event that call signalling is received by either PBX 148 and SMP 164 in the form of DTMF tones, the call signalling will reach its intended destination.

Following SMP 164's acknowledgment of the trunk session parameters, performance of method 1000 continues at 1015a or 1015b. As discussed above, two alternatives are provided to accommodate both PBXs capable of dynamic switching between DTMF tone relaying mechanisms and PBXs that lack such capabilities. In performing block 1015, SMP 164 sends a new INVITE message or a RE-INVITE message to PBX 148 via SIP-L to obtain line media session parameters ("SPD2"). Having obtained the line session parameters used by PBX 148 to manage the call leg between PBX 148 and the other party to the call, SMP 164 proceeds to join the two call legs by sending a RE-INVITE message via SIP-T including the line session parameters. PBX 148 returns refreshed trunk session parameters ("SDP3"), and SMP 164 provides those refreshed trunk session parameters to PBX 148 via SIP-L, thus joining the trunk and line media sessions, completing the media shuffle and allowing mobile electronic device 104 to communicate with the other party or parties.

Performance of method 1000 continues at block 120, at which a BYE message is sent by SMP 164 to mobile electronic device 104 and PBX 148 to terminate the Wi-Fi session between mobile electronic device 104 and PBX 148. Finally, SMP 164 sends a 200 OK message to mobile electronic device 104 indicating that the handoff concluded successfully.

It will now be apparent that other variations can also be made to the methods and system described herein. For example, in other embodiments, applications 232 and 316 can be maintained on computer readable storage media other than memory 208 and 308, respectively. Exemplary computer readable storage media include fixed, tangible storage media readable directly by processors 204 and 304 (e.g., removable diskette, CD-ROM, ROM, fixed disk, USB drive). Other exemplary computer readable storage media include remote storage from which computer readable instructions are transmittable to processors 204 and 304.

Figure 3:
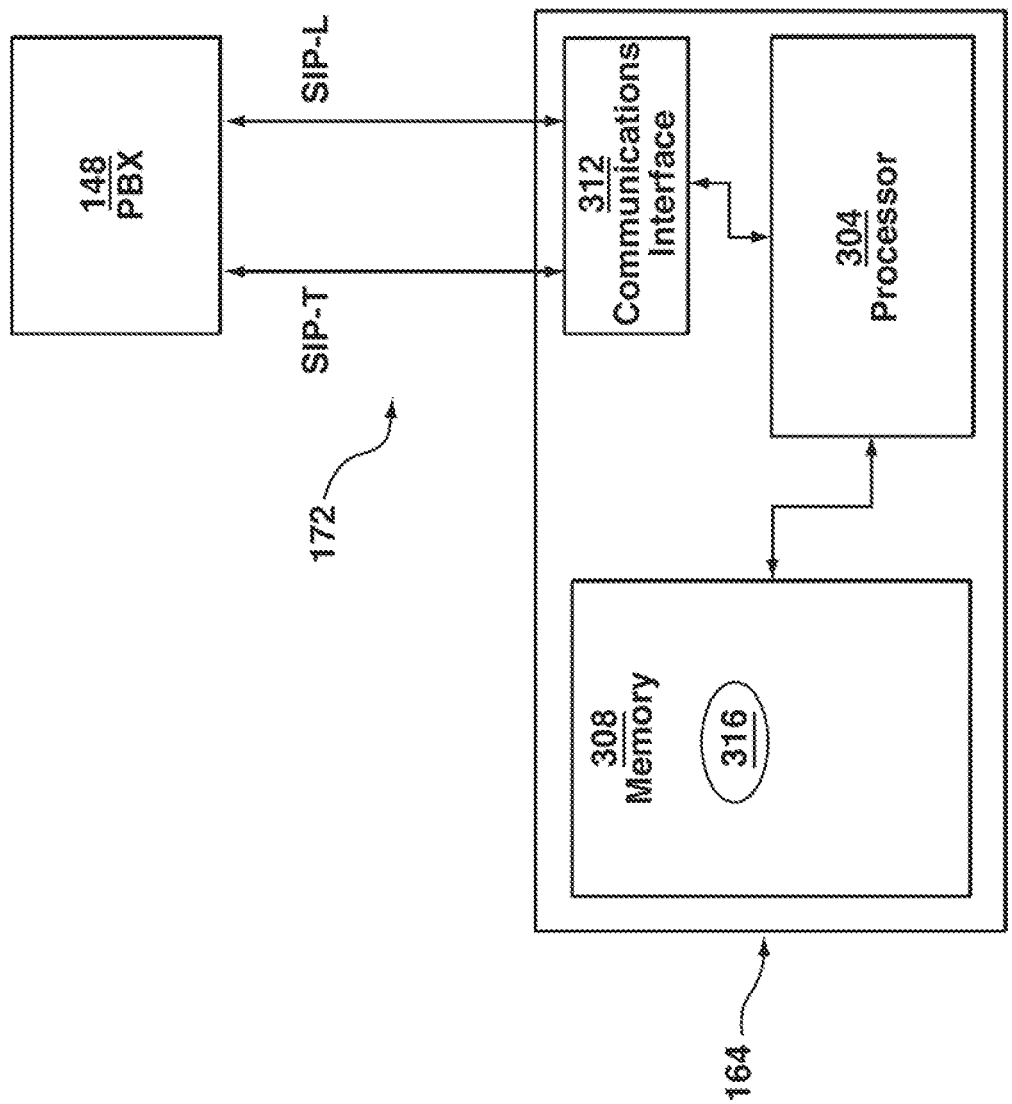
FIG. 3 depicts a schematic block diagram of the Service Management Platform (SMP) of FIG. 1, according to a non-limiting embodiment.
Figure 15:
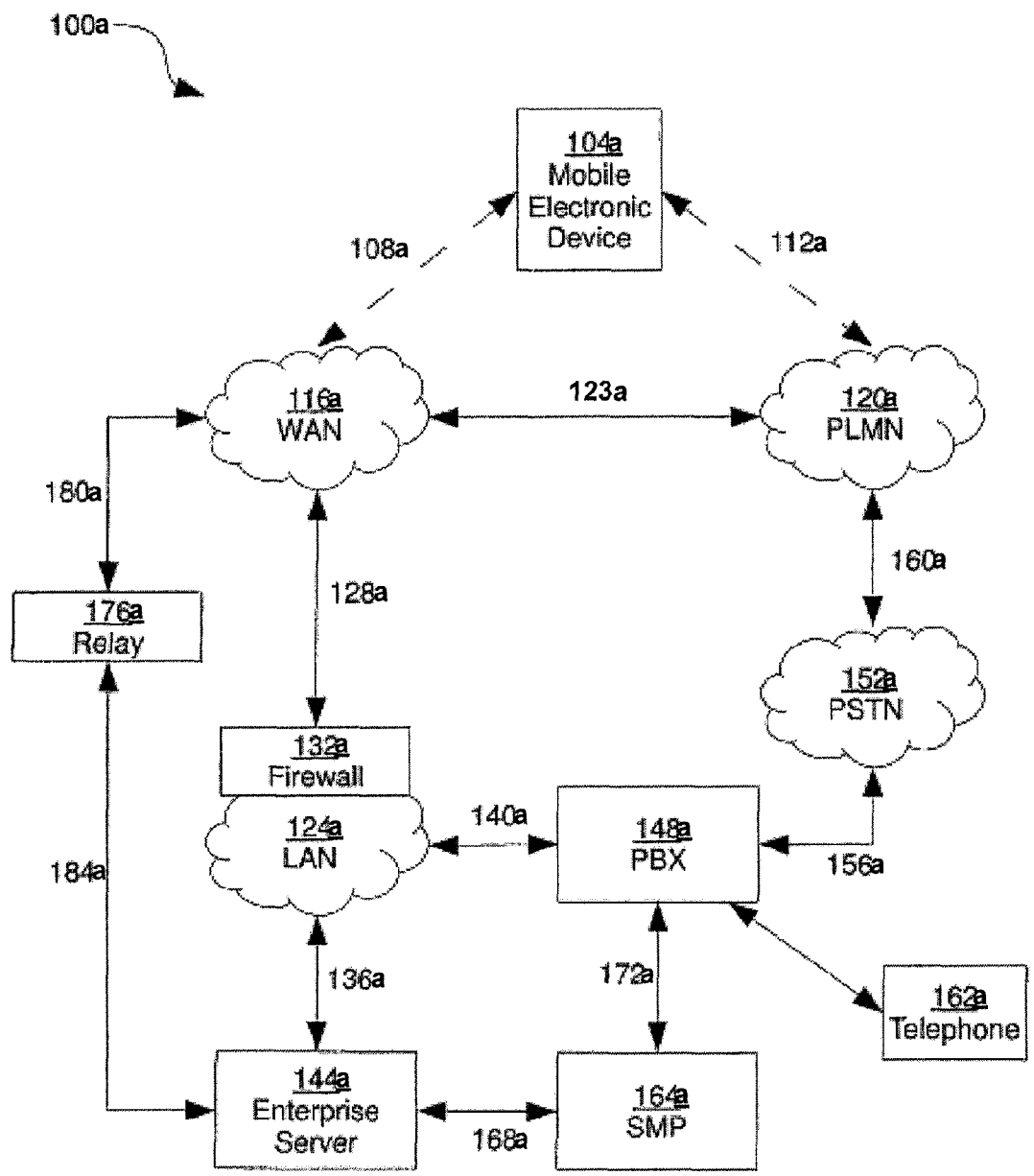
FIG. 15 depicts a system for managing enterprise-related communications, according to a non-limiting embodiment.
Figure 16:
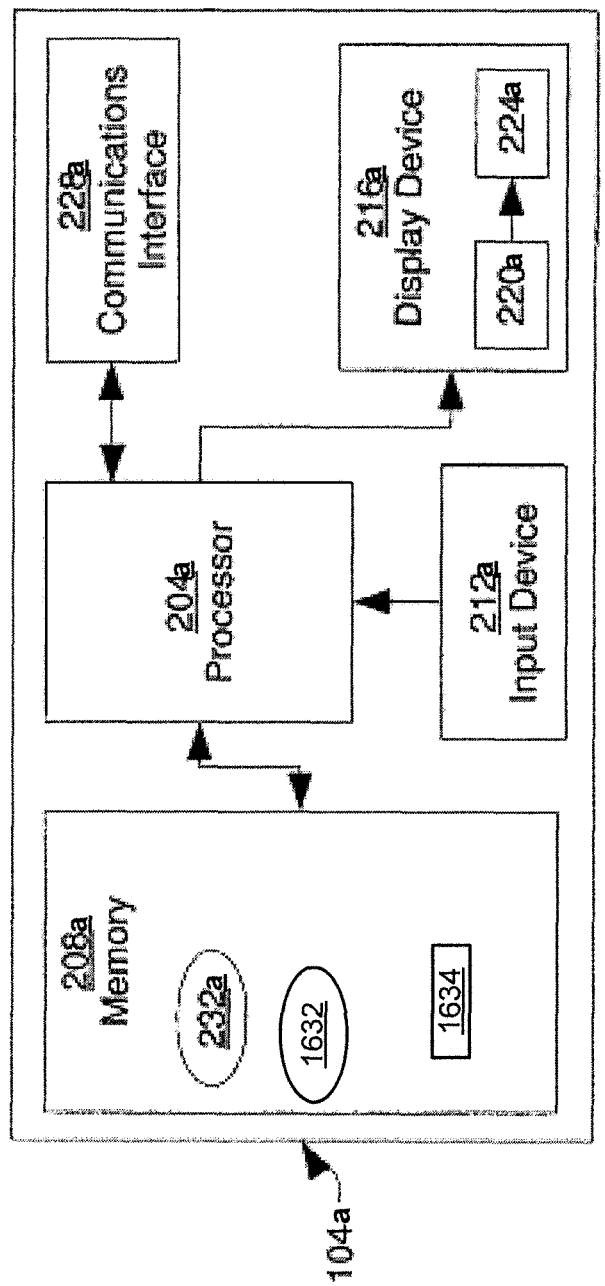
FIG. 16 depicts a schematic block diagram of the mobile electronic device of FIG. 15, according to a non-limiting embodiment.
Figure 17:
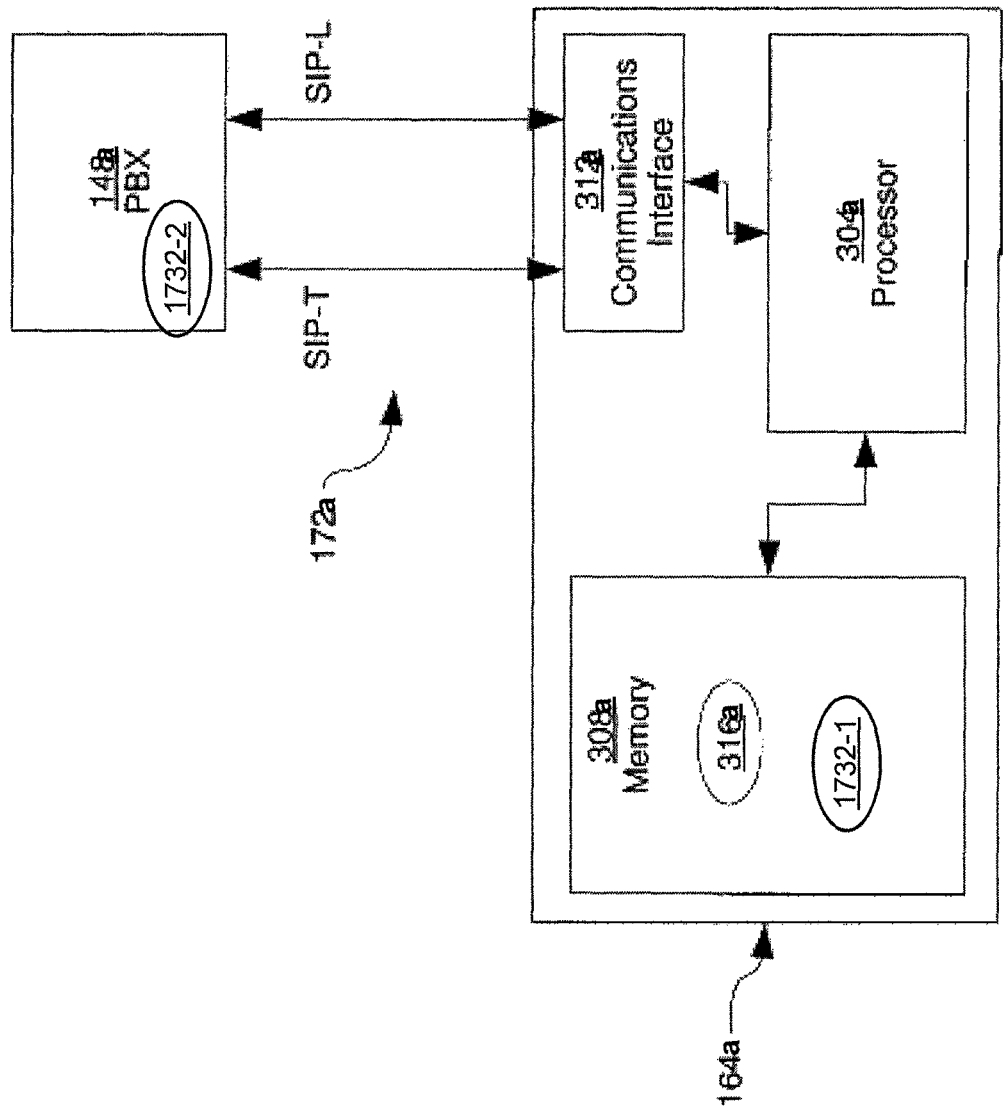
FIG. 17 depicts a schematic block diagram of the Service Management Platform (SMP) of FIG. 15, according to a non-limiting embodiment.

Attention is now directed to FIGS. 15, 16, and 17, which are similar to FIGS. 1, 2 and 3 respectively with like elements having like numbers, however with an "a" appended thereto. For example, mobile electronic device 104a is similar to mobile electronic device 104, however, with reference to FIG. 16, mobile electronic device 104a comprises an application 1632 for evaluating quality of a media session, as will presently be described, maintained in memory 208a. Application 1632 can comprise computer readable instructions for execution by processor 204a. In general, processor 204a can be configured, by execution of application 1632, to perform various actions as discussed below, for example in conjunction with phone application 232a.

In some implementations, mobile electronic device 104a can also store a predetermined media file 1634 as described below.

Furthermore, at least one of SMP server 164a and PBX 148a respectively comprises an application 1732-1, 1732-2 for enabling at least one of SMP server 164a and PBX 148a to act as an echo server, as will presently be described. Application 1732-1 can be maintained in memory 308a. Application 1732-1 can comprise computer readable instructions for execution by processor 304a. In general, processor 304a can be configured, via execution of application 1732-1 to cause SMP server 164a to act as an echo server, for example in conjunction with call control application 316a. Alternatively, PBX 148a can comprise application 1732-2 similar to application 1732-1. Hereafter, applications 1732-1, 1732-2 will be generically referred to as application 1732.

Figure 18:
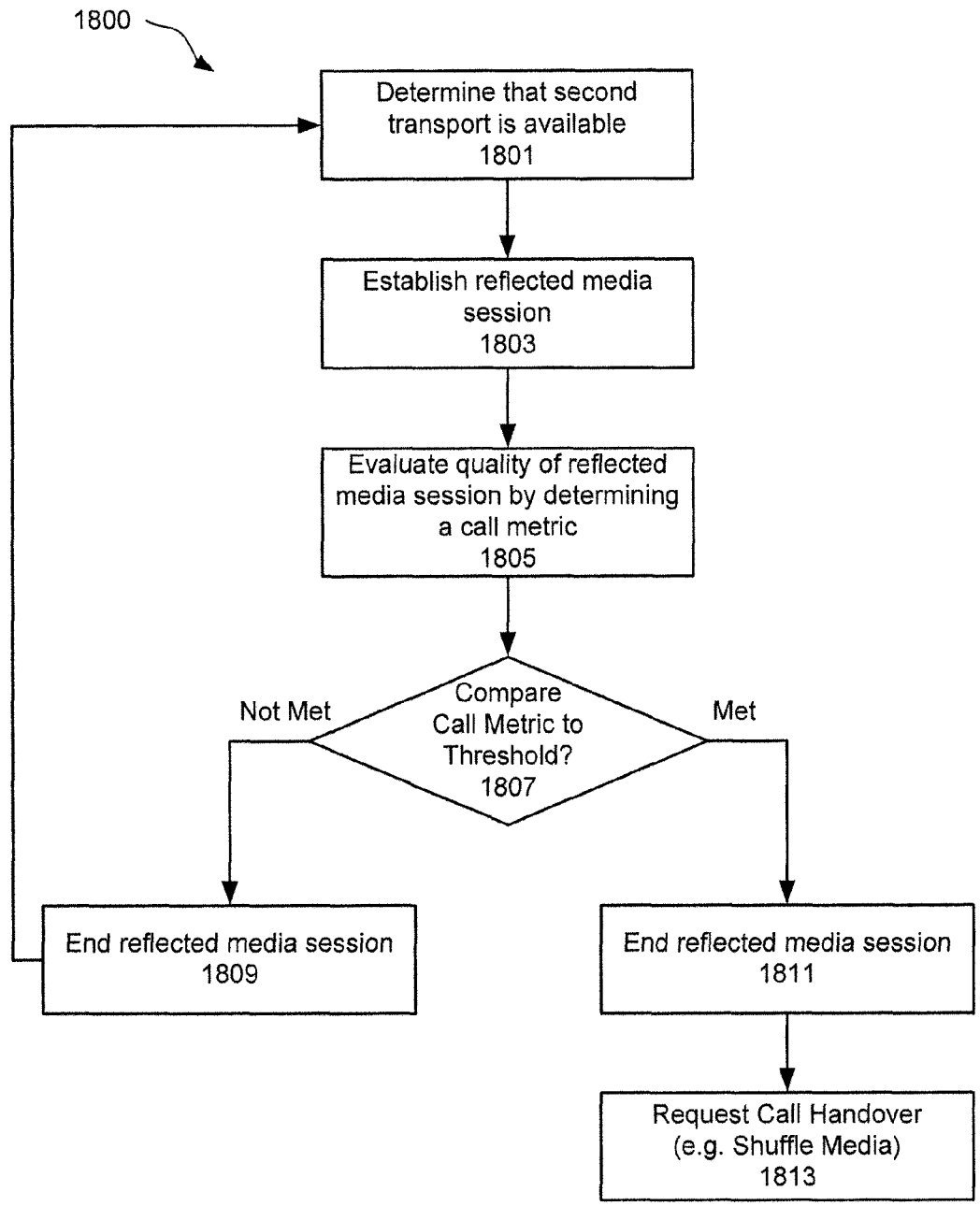
FIG. 18 depicts a method for managing call hand-off, according to a non-limiting embodiment.

Referring now to FIG. 18, a flowchart is depicted showing a method 1800 of initiating call handoff between first and second transports. As seen in FIG. 8, processor 204a of mobile electronic device 104a can be configured to perform method 1800 after a call has been initiated over a first transport, and hence communications interface 228a is engaged in a first media session with a remote communication device such as telephone 162a over a first transport via a communication network, such as PLMN 120*a* and PSTN 152*a*. The call can be initiated, for example, according to any of the scenarios discussed above or variations thereto.

It is furthermore appreciated that method 1800 can be performed as a part of method 800, for example prior to and/or as a part of any of blocks 805 to 825. In some implementations, method 1800 can be performed as part of block 805, for example in monitoring available transports.

In the description of method 1800, reference will be made to FIGS. 19 to 21, each of which are similar to FIG. 15, with like elements having like numbers.

At block 1801 it is determine that a second transport is available such that a handover can occur from the first transport to the second transport. For example, mobile electronic device 104*a* can be engaged in the first media session with telephone 162*a* via link 112*a*, PLMN 120*a*, PSTN 152*a*, and PBX 148*a*, as represented by arrow 1901 in FIG. 19, and mobile electronic device 104*a* can determined that a WiFi transport is available via link 108*a* and WAN 116*a*.

Figure 22:
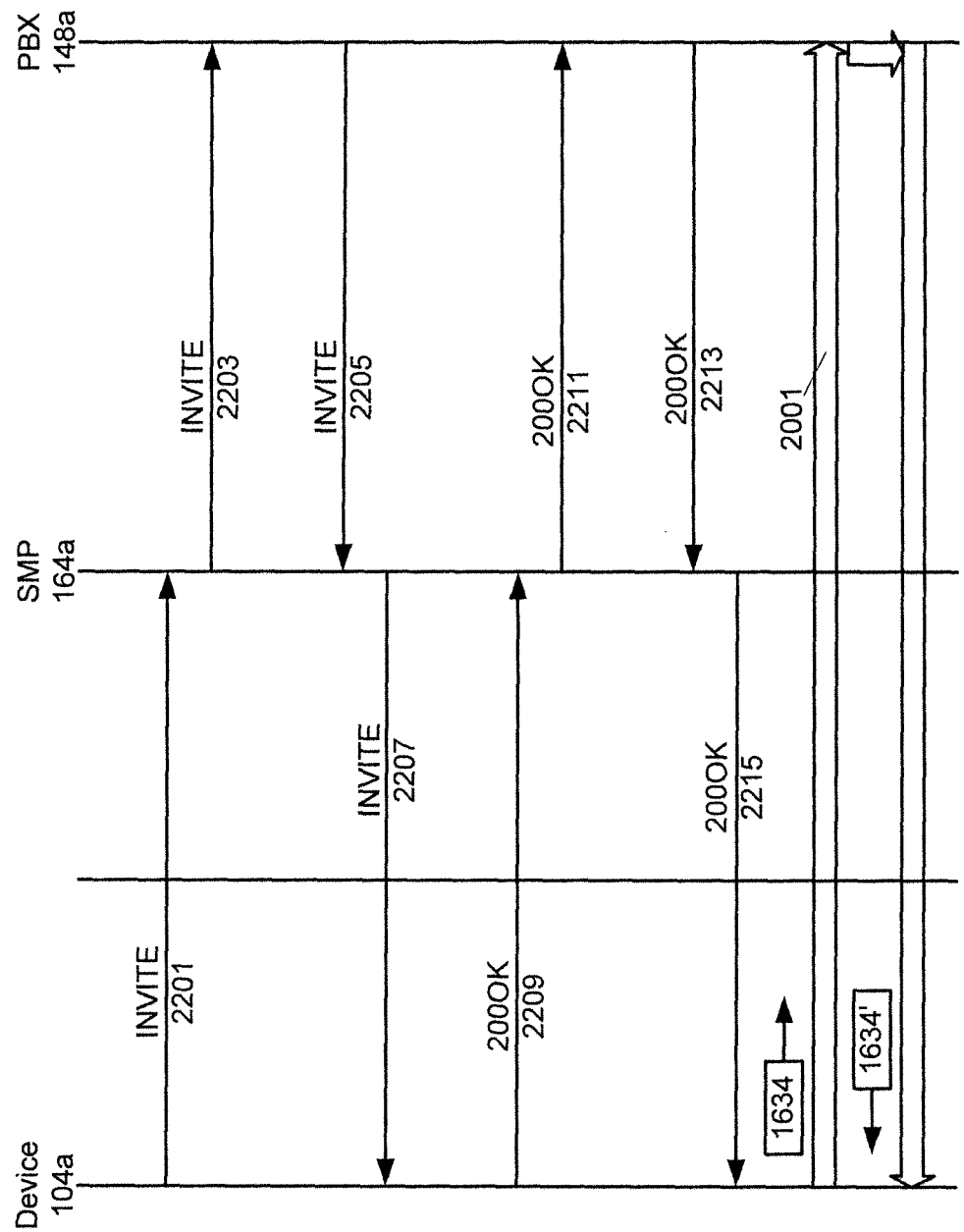
FIG. 22 depicts a call flow diagram for setting up a reflected media session, according to a non-limiting embodiment.

At block 1803, in order to determine quality of the second transport, a reflected media session 2001 is established between the mobile electronic device 104*a* and itself over the second transport via an echo server in the communication network thereby mimicking an end-to-end media session via the second transport and the communication network. For example, in FIG. 20, PBX 148*a* acts as the echo server with call control being handled by SMP server 164*a*. A call flow diagram for setting up the reflected media session 2001 is depicted in FIG. 22, as described below.

In general, however, it is appreciated that reflected media session 2001 comprises a media session between device 104*a* and device 104*a* (i.e. a media session between device 104*a* and itself), such that a call mimicking an end-to-end media session via a transport and a communication network used to carry the call is implemented. In other words, a media session originated by device 104*a* is "reflected" back to device 104*a*. In general, it is appreciated that device 104*a* is hence enabled to accept calls/media session requests from itself, and that servers in system 100*a* (e.g. PBX 148*a*, SMP 164*a* and/or server 144*a*) are enabled to establish reflected media session 2001. In any event, as will presently be described, the end-to-end quality of the transport can be evaluated at a device 104*a* prior to handover of a call to the transport.

For example, at block 1805, quality of the reflected media session 2001 is evaluated by determining a call metric based on call transport data received at the mobile electronic device 104*a* from itself in the reflected media session 2001. Various implementations of call metrics will be described in detail below.

At block 1807 the call metric is compared to a threshold. For example, when the threshold is not met, it is determined that the second transport is of poor quality and reflected media session 2001 ends at block 1809 (e.g. mobile electronic device 104*a* ends the reflected media session 2001 (i.e. hangs up). The first media session is thereby maintained until the call ends. In some implementations (as depicted), blocks 1801 to 1807 are repeated periodically in the event quality of the second transport improves; in these implementations, repeating method 1800 can be part of the cycle between blocks 805 and 810 of method 800 In other implementations, however, method 1800 ends.

Figure 21:
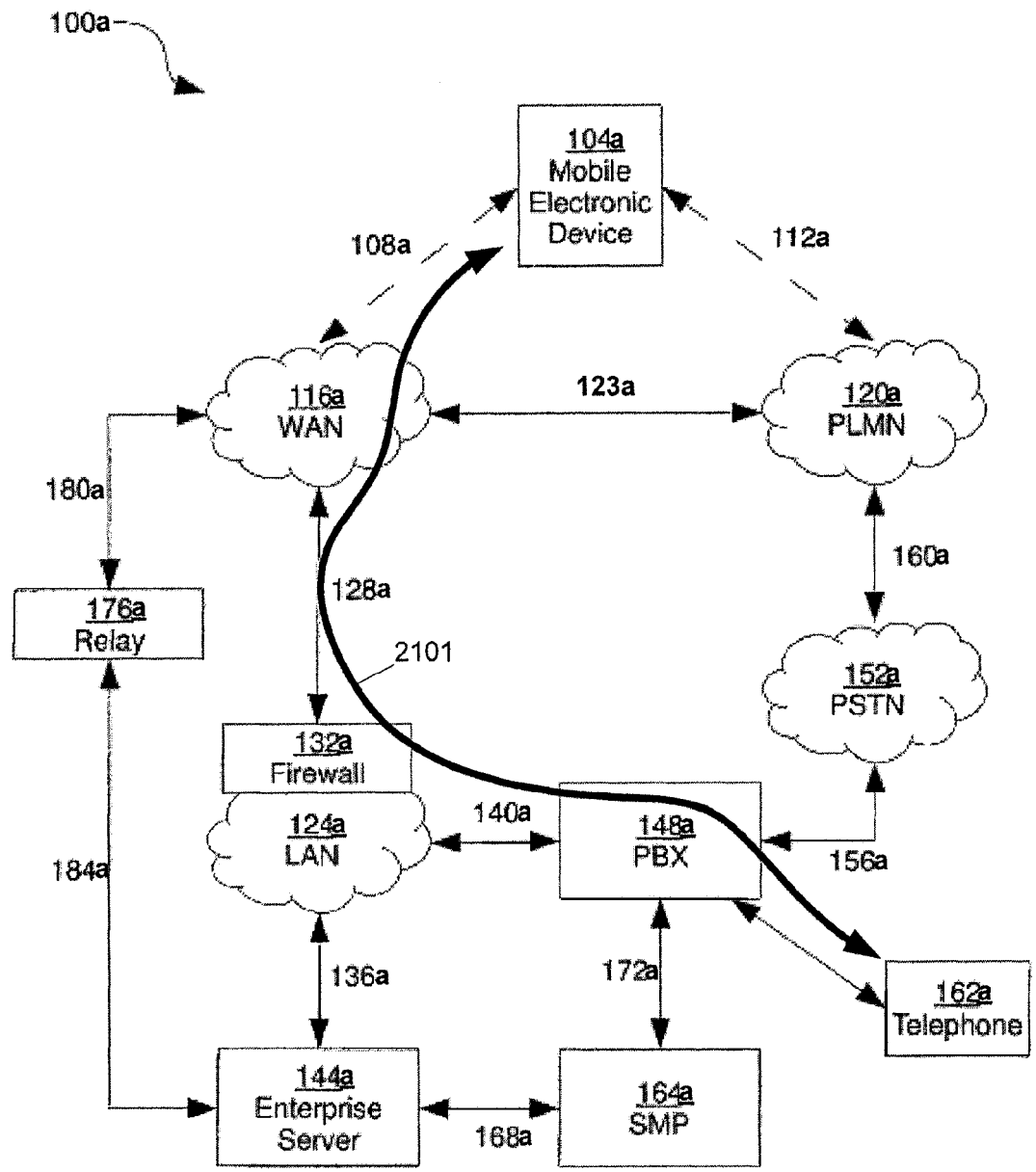

However, returning to block 1807, when the threshold is met, it is determined that the second transport is of good quality; reflected media session 2001 ends at block 1811 (similar to block 1809) however, at block 1813 mobile electronic device 104*a* requests call handover (e.g. shuffling of call media) from the first media session to a second media session over the second transport, such that handover occurs from the first transport to the second transport as represented by arrow 2101 in FIG. 21. The request for call handover (e.g. shuffling) of call media can occur in any suitable manner similar to those described above. Hence, the reflected media session 2001 is terminated after the quality of the reflected media session 2001 is evaluated. Further, the first media session is terminated after handover occurs from the first transport to the second transport.

Figure 19:
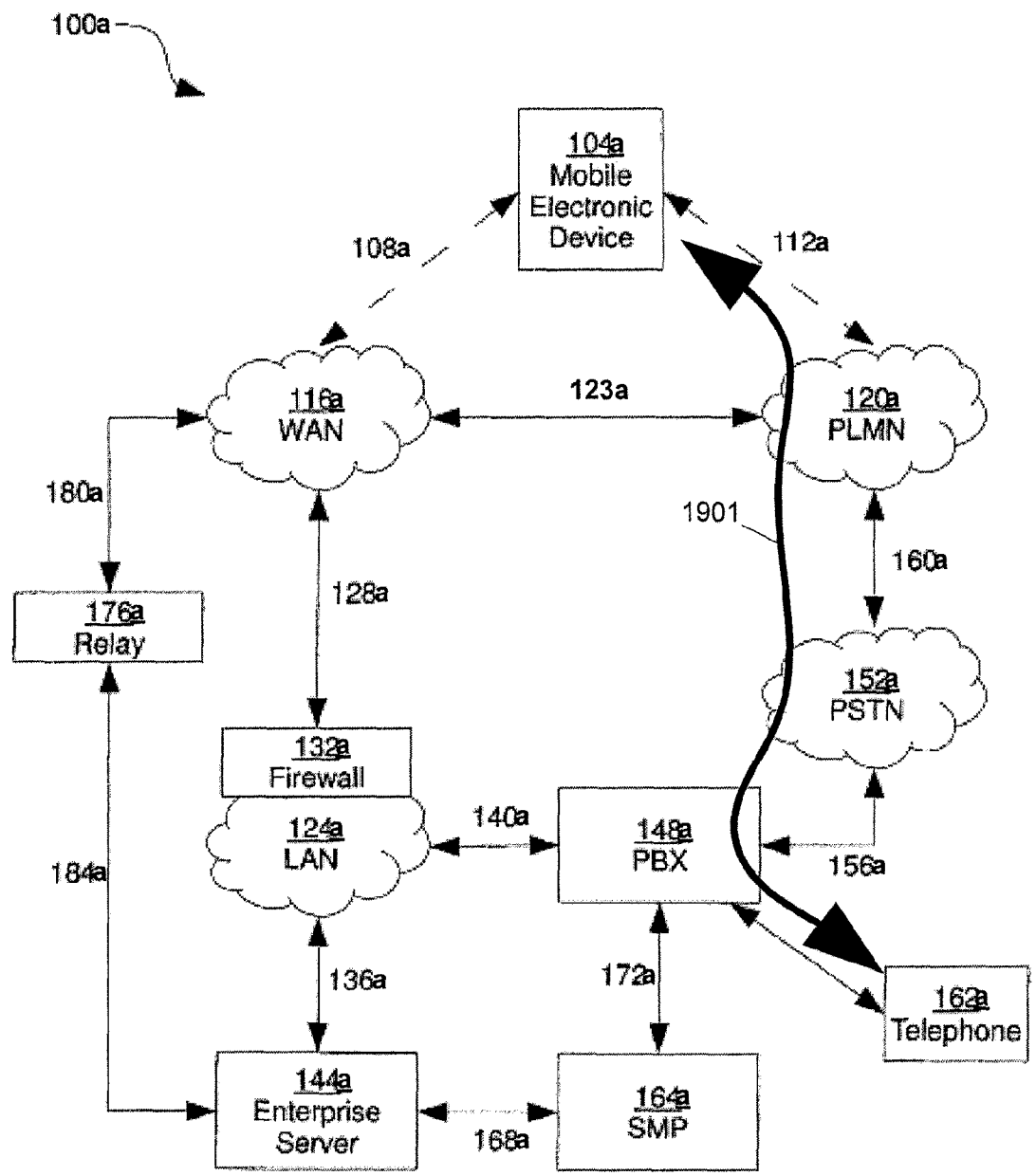
FIGS. 19 to 21 depict a system for managing enterprise-related communications, according to a non-limiting embodiment.
Figure 20:
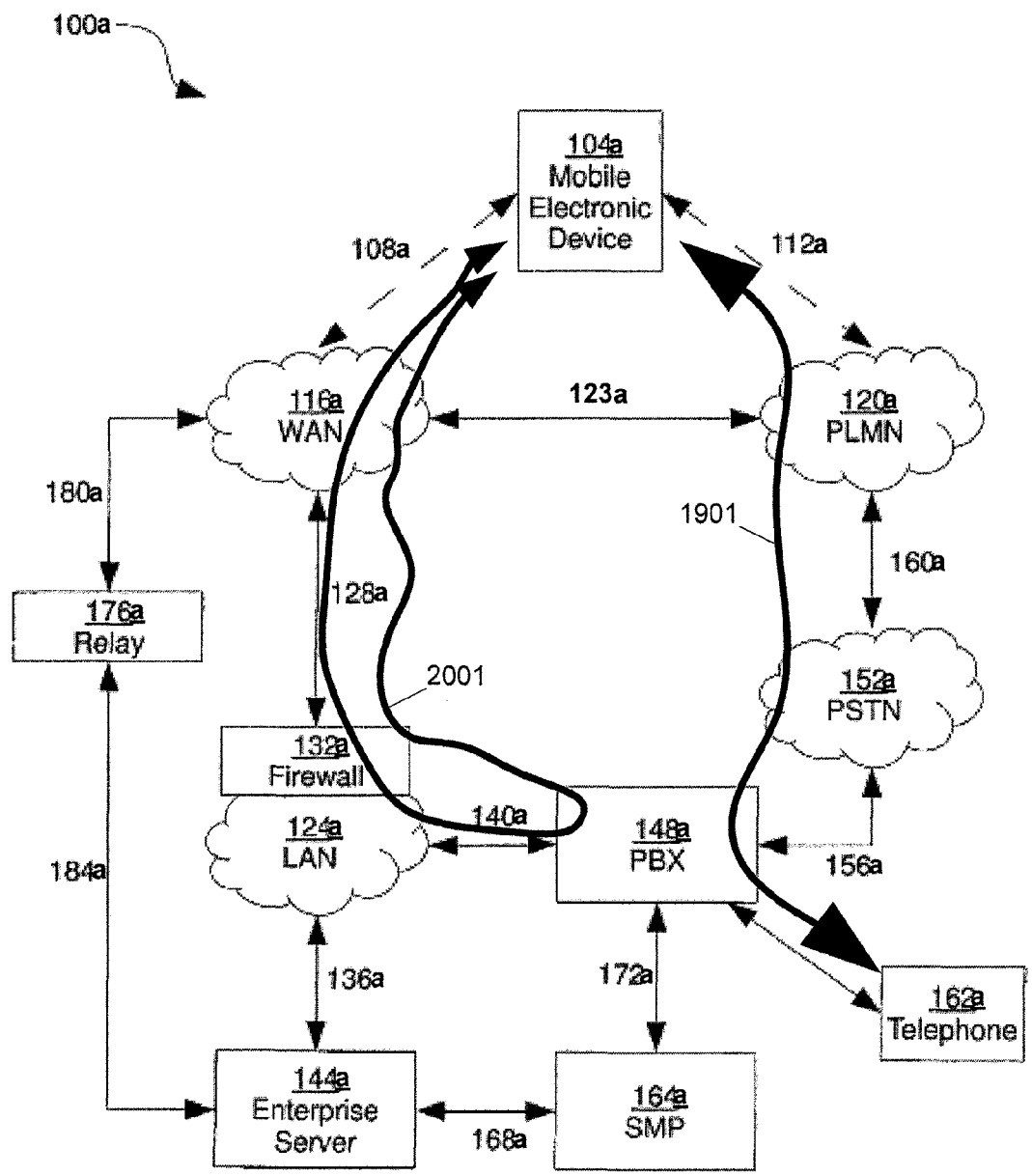

It is appreciated that while in FIGS. 19 to 21, the first transport comprises a mobile transport and the second transport comprises a WiFi transport, in other implementations, the first transport can comprise a WiFi transport and the evaluated second transport can comprise a mobile transport.

Attention is now directed to FIG. 22 which depicts a call flow diagram for setting up the reflected media session 2001. At block 2201, mobile electronic device 104*a* transmits an INVITE to SMP server 164*a*, which in turn sends an INVITE to PBX 148*a* at block 2203. It is appreciated that the INVITE sent at block 2201 is sent from mobile electronic device 104*a* over the second transport and includes a request to set up a call with itself (i.e. a call from mobile electronic device 104*a* to mobile electronic device 104*a*).

PBX 148*a* treats the INVITE received at block 2203 as with any other invite to set up a call and in turn transmits an INVITE at block 2205 to the destination device via SMP server 164*a*, the destination device being mobile electronic device 104*a*. In other words, the destination device and the originating device are the same, and PBX 148*a* acts as the echo server of method 1800.

SMP server 164*a* in turn transmits an INVITE to mobile electronic device 104*a*, which responds at block 2209 with a "200OK" acknowledgement, which gets passed to PBX 148*a* by SMP server 164*a* at block 2211. Again, PBX 148*a* treats the acknowledgement as when setting up a call between a destination device and an originating device and passes the acknowledgment onto the originating device which is mobile electronic device 104*a*. Reflected media session 2001 is thereby established from mobile electronic device 104*a* to PBX 148*a* and back to mobile electronic device 104*a*. In other words, the PBX 148*a* "reflects" call transport data received from mobile electronic device 148*a* back to mobile electronic device 148*a* in the reflected media session 2001.

It is appreciated that in these implementations, SMP server 164*a* is enabled to receive via a communication network and the communications interface 312*a* a request from the mobile electronic device 104*a* to establish a reflected media session with itself, for example via the PBX 148*a*, and cause call transport data from the mobile electronic device 104*a* to be reflected back to the mobile electronic device 104*a* for evaluation at the mobile electronic device 104*a*. Indeed, from this perspective, SMP server 164*a* can be appreciated to comprise the echo server as while the reflected media session is between mobile electronic device 104*a* and PBX 148*a*, PBX 148*a* operates under control of SMP server 164*a*, with call control data being exchanged between mobile electronic device 104*a* and SMP server 164*a*.

In any event, in some implementations, the call transport data comprises an RTP (Real-time Transport Protocol) stream transmitted from the mobile electronic device 104*a* to the echo server (e.g. PBX 148*a*) and back to the mobile electronic device 104*a* over the Wi-Fi transport. Returning briefly to FIG. 18, in these implementations, the call metric determined at block 1805 can comprise any suitable call metric associated with the RTP stream. For example, the call metric can comprise a measure of at least one of jitter and packet loss of returned call transport data in the RTP stream. In other words, as each RTP packet is numbered, the packet loss can be determined at mobile electronic device 104*a*, and/or the time between packet arrival (i.e. jitter) can be determined at mobile electronic device 104*a*. Any suitable threshold can be used to determine whether one or both of jitter and packet loss is acceptable, for example a given amount of jitter and/or a given amount of packet loss.

It is appreciated that in some implementations, no media data is actually transported in the call transport data. In other words, if reflected media session 2001 comprised a voice call between an originating device and a destination device, voice data would be carried in the call transport data (i.e. voice data representing a conversation between users). However, in these implementations, as no conversation is occurring, the payload of the content transport data can be empty.

Alternatively, predetermined media file 1634 can be transmitted by mobile electronic device 104*a* in the call transport stream, as depicted. For example, predetermined media file 1634 can comprise any suitable pre-recorded voice data (e.g. "Testing 123", though the content of predetermined media file 1634 is generally appreciated to be non-limiting) of any suitable length. When the predetermined media file 1634 is returned as returned media data 1634', as depicted in FIG. 22, the call metric can be based on comparing the predetermined media data 1634 with returned media data 1634' received in returned call transport data.

For example, mobile electronic device 104*a* can play the predetermined media file 1634 in the reflected media session, and compare the predetermined media file 1634 to the returned media data 1634' to evaluate the audio quality of the returned media data 1634'. Any suitable metric can be used to determine the audio quality including but not limited to a size of the returned media data 1634' as compared to a size of the predetermined media file 1634, a range of the of the returned media data 1634' as compared to a range of the predetermined media file 1634, a tonal quality of the returned media data 1634' as compared to a tonal quality of the predetermined media file 1634, distortion of the of the returned media data 1634' as compared to the predetermined media file 1634, noise of the returned media data 1634' as compared to the predetermined media file 1634, or the like, and/or a combination. Furthermore, any suitable threshold can be set to determined whether the audio quality is poor or not, including but not limited to a given size difference, a given range difference, a given tonal difference, a given level of distortion, a given level of noise or the like, and/or a combination. It is appreciated that the given threshold and/or given thresholds further corresponds to the technique and/or techniques used to determine the call metric(s).

Figure 23:
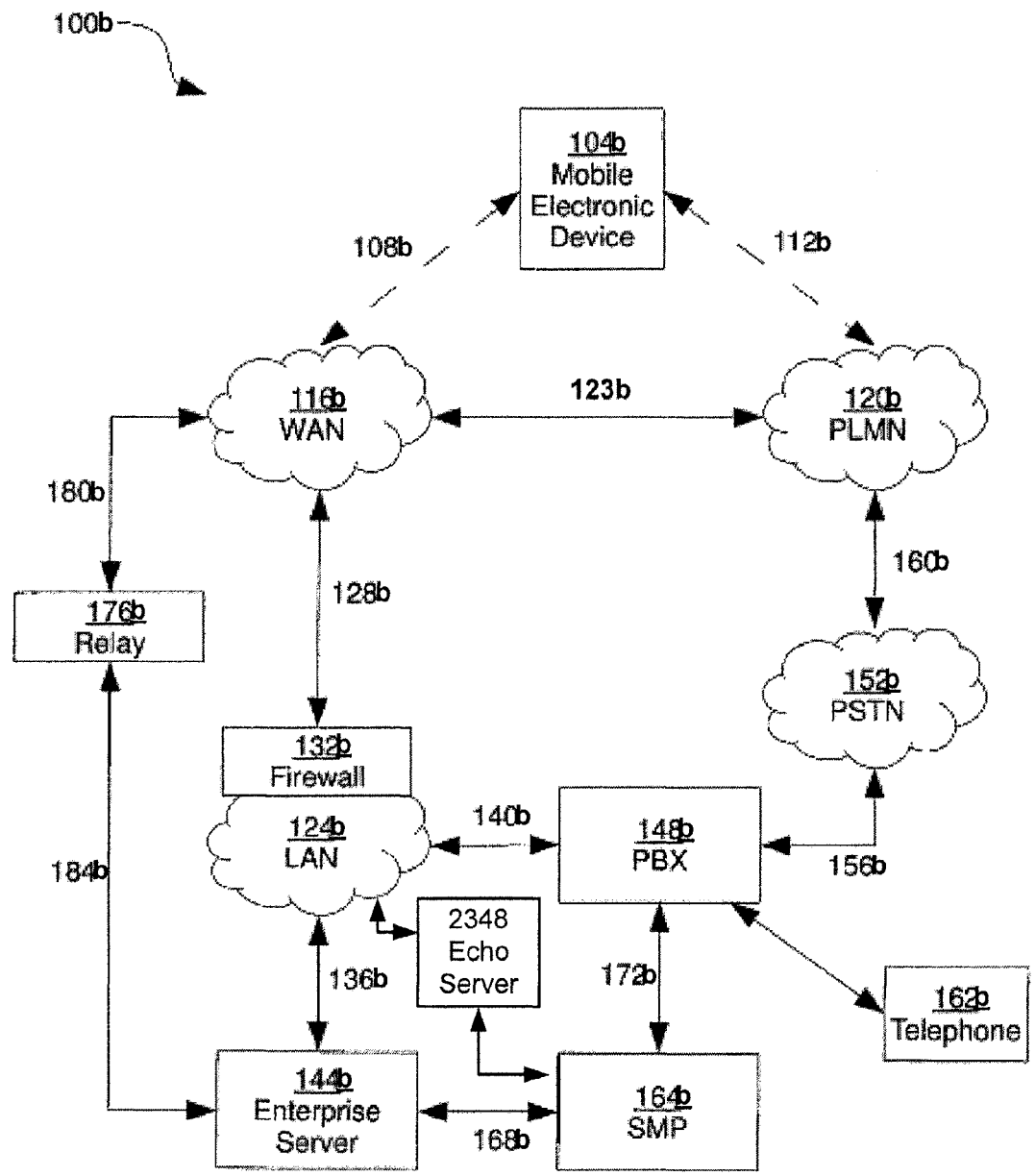
FIG. 23 depicts a system for managing enterprise-related communications, according to a non-limiting embodiment.

Attention is next directed to FIG. 23, which depicts a system 100*b*, FIG. 23 being substantially similar to FIG. 15 with like elements having like numbers, however with a "b" appended thereto rather than an "a". It is appreciated that system 100*b* is similar to system 100*a*, however system 100*b* further comprises a dedicated echo server 2348. Method 1800 can also be performed in system 100*b*, however rather than establish a reflected media session with PBX 148*b*, a reflected media session is established with echo server 2348, for example via link 108*b*, WAN 116*b*, and LAN 124*b*. Method 1800 otherwise proceeds as described above. Call flow for setting up the reflected media session in system 100*b* can proceed similar to FIG. 21, however echo server 2348 replaces PBX 148*b*. Hence, in these implementations echo server 2348 is controlled by SMP server 164*b*, similar to PBX 148*b*.

In any event, by establishing a call mimicking an end-to-end media session via a transport and a communication network used to carry the call, the end-to-end quality of the transport can be evaluated at a mobile electronic device prior to handover of a call to the transport.

Those skilled in the art will appreciate that in some embodiments, the functionality of applications can be implemented using pre-programmed hardware or firmware elements (e.g., application specific integrated circuits (ASICs), electrically erasable programmable read-only memories (EEPROMs), etc.), or other related components.

Those skilled in the art will further appreciate that in some implementations, the functionality of mobile electronic devices 104, 104*a*, 104*b*, servers 144, 144*a*, 144*b*, 164, 164*a*, 164*b* and PBX 148, 148*a*, 148*b* can be implemented using pre-programmed hardware or firmware elements (e.g., application specific integrated circuits (ASICs), electrically erasable programmable read-only memories (EEPROMs), etc.), or other related components. In other implementations, the functionality of mobile electronic devices 104, 104*a*, 104*b*, servers 144, 144*a*, 144*b*, 164, 164*a*, 164*b* and PBX 148, 148*a*, 148*b* can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The invention claimed is:

1. A mobile electronic device comprising:
a processor and a communications interface, the processor enabled to:
while the communications interface is engaged in a first media session with a remote communication device over a first transport via a communication network:
determine that a second transport is available;
establish a reflected media session via an echo server over the second transport;
evaluate quality of the reflected media session by determining a call metric based on call transport data received at the mobile electronic device from the mobile electronic device (itself) in the reflected media session; and request call handover from the first media session to a second media session over the second transport when the call metric indicates that the quality of the reflected media session meets a threshold.

2. The mobile electronic device of claim 1, wherein the reflected media session is terminated after the quality of the reflected media session is evaluated.

3. The mobile electronic device of claim 1, wherein the first media session is terminated after handover occurs from the first transport to the second transport.

4. The mobile electronic device of claim 1, wherein the first transport is one of a Wi-Fi transport and a mobile transport, and wherein the second transport is the other of the Wi-Fi transport and the mobile transport.

5. The mobile electronic device of claim 1, wherein the first transport is a mobile transport and the second transport is a Wi-Fi transport, and the call transport data comprises an RTP (Real-time Transport Protocol) stream transmitted from the mobile electronic device to the echo server and back to the mobile electronic device over the Wi-Fi transport and through the communication network.

6. The mobile electronic device of claim 1, wherein the call metric comprises a measure of at least one of jitter and packet loss of returned call transport data.

7. The mobile electronic device of claim 1, wherein the call transport data comprises predetermined media data stored in a memory of the mobile electronic device, and the call metric is based on comparing the predetermined media data with returned media data received in returned call transport data.

8. The mobile electronic device of claim 1, wherein to establish the reflected media session, the processor is further enabled to transmit a request to the echo server to establish the reflected media session.

9. A method comprising:
while a communications interface of a mobile electronic device is engaged in a first media session with a remote communication device over a first transport via a communication network, determining that a second transport is available;
establishing a reflected media session between the mobile electronic device over the second transport via an echo server;
evaluating quality of the reflected media session by determining a call metric based on call transport data received at the mobile electronic device from the mobile electronic device (itself) in the reflected media session; and
requesting call handover from the first media session to a second media session over the second transport when the call metric indicates that the quality of the reflected media session meets a threshold.

10. A non-transitory computer program product, comprising a computer usable medium having a computer readable program code adapted to be executed to implement a method comprising:
while a communications interface of a mobile electronic device is engaged in a first media session with a remote communication device over a first transport via a communication network, determining that a second transport is available;
establishing a reflected media session between the mobile electronic device over the second transport via an echo server;
evaluating quality of the reflected media session by determining a call metric based on call transport data received at the mobile electronic device from the mobile electronic device (itself) in the reflected media session; and
requesting call handover from the first media session to a second media session over the second transport when the call metric indicates that the quality of the reflected media session meets a threshold.

* * * * *